(12) United States Patent
Ono et al.

(10) Patent No.: US 9,977,418 B2
(45) Date of Patent: May 22, 2018

(54) CONTROL DEVICE, CONTROL METHOD, INFORMATION PROCESSING PROGRAM, AND RECORDING MEDIUM

(71) Applicant: OMRON Corporation, Kyoto-shi, Kyoto (JP)

(72) Inventors: Yasushi Ono, Kusatsu (JP); Mamoru Egi, Otsu (JP); Yasutomo Kawanishi, Kusatsu (JP); Yasumoto Mori, Joyo (JP)

(73) Assignee: OMRON Corporation, Kyoto-shi (JP)

( * ) Notice: Subject to any disclaimer, the term of this patent is extended or adjusted under 35 U.S.C. 154(b) by 0 days. days.

(21) Appl. No.: 15/342,213

(22) Filed: Nov. 3, 2016

(65) Prior Publication Data

US 2017/0146971 A1    May 25, 2017

(30) Foreign Application Priority Data

Nov. 19, 2015 (JP) ................. 2015-226721
Mar. 11, 2016 (JP) ................. 2016-048952

(51) Int. Cl.
| | | |
|---|---|---|
| G05B 13/04 | (2006.01) | |
| G05D 3/12 | (2006.01) | |
| G05B 19/06 | (2006.01) | |
| H02K 11/21 | (2016.01) | |
| G05B 19/10 | (2006.01) | |
| G05B 19/402 | (2006.01) | |

(52) U.S. Cl.
CPC ........... *G05B 19/06* (2013.01); *G05B 13/041* (2013.01); *G05B 19/106* (2013.01); *G05B 19/402* (2013.01); *H02K 11/21* (2016.01); *G05B 2219/34013* (2013.01)

(58) Field of Classification Search
CPC ... A61B 34/30; A61B 90/361; A61B 19/2203; A61B 19/5212; A61B 19/22; A61B 2034/305; A61B 34/37; A61B 34/70; G11B 5/5547; G11B 5/59622; G11B 19/24; G11B 19/28; G11B 2005/0016; G11B 5/59683
USPC ......................... 318/610, 623, 626
See application file for complete search history.

(56) References Cited

U.S. PATENT DOCUMENTS 4,713,596 A * 12/1987 Bose .................. H02P 21/22
                                                        318/561
5,341,078 A    8/1994 Torii et al.
5,699,207 A * 12/1997 Supino ............... G11B 5/5547
                                                        318/568.18

(Continued)

FOREIGN PATENT DOCUMENTS

| EP | 1486835 A2 | 12/2004 |
|---|---|---|
| JP | H08-168280 A | 6/1996 |
| JP | H08-297512 A | 11/1996 |

OTHER PUBLICATIONS

Extended European Search Report (EESR) dated Apr. 19, 2017 in a counterpart European patent application.

*Primary Examiner* — Bentsu Ro
(74) *Attorney, Agent, or Firm* — Metrolexis Law Group, PLLC

(57) ABSTRACT

A user can cause a servo motor to perform desired operation without occurrence of overshoot and hunting while being unconscious of a maximum torque that can be output from the servo motor. A control device that implements model following control includes a feedforward controller that implements sliding mode control.

13 Claims, 12 Drawing Sheets

(56) References Cited

U.S. PATENT DOCUMENTS

| | | | | | |
|---|---|---|---|---|---|
| 5,781,365 | A * | 7/1998 | Romano | | G11B 5/5547 318/568.18 |
| 5,825,582 | A * | 10/1998 | Supino | | G11B 5/5547 318/568.18 |
| 5,847,895 | A * | 12/1998 | Romano | | G11B 5/5547 318/568.18 |
| 5,982,721 | A * | 11/1999 | Supino | | G05B 13/0255 369/44.28 |
| 6,236,895 | B1 * | 5/2001 | Romano | | G05B 13/0255 318/568.18 |
| 6,622,080 | B2 * | 9/2003 | Yang | | F02D 11/105 123/399 |
| 6,798,611 | B1 * | 9/2004 | Romano | | G11B 5/5582 318/568.18 |
| 6,831,809 | B2 * | 12/2004 | Kagami | | G11B 5/59622 318/561 |
| 7,161,761 | B2 * | 1/2007 | Atsumi | | G11B 5/5547 360/78.09 |
| 7,437,201 | B2 * | 10/2008 | Cullen | | G05B 17/02 700/29 |
| 7,453,227 | B2 * | 11/2008 | Prisco | | A61B 19/22 318/568.11 |
| 7,606,624 | B2 * | 10/2009 | Cullen | | G05B 17/02 700/29 |
| 7,899,578 | B2 * | 3/2011 | Prisco | | A61B 19/22 700/254 |
| 8,723,472 | B2 * | 5/2014 | Takeuchi | | G05B 19/404 318/135 |
| 9,171,567 | B1 * | 10/2015 | Nicholls | | G11B 19/28 |
| 2002/0159187 | A1 * | 10/2002 | Kagami | | G11B 20/10527 360/75 |
| 2003/0023365 | A1 * | 1/2003 | Yang | | F02D 11/105 701/103 |
| 2004/0135534 | A1 * | 7/2004 | Cullen | | G05B 17/02 318/609 |
| 2004/0239282 | A1 * | 12/2004 | Yoneda | | G05B 13/047 318/623 |
| 2005/0207057 | A1 * | 9/2005 | Atsumi | | G11B 5/5547 360/78.09 |
| 2006/0186845 | A1 * | 8/2006 | Terada | | G05B 19/19 318/432 |
| 2009/0021205 | A1 * | 1/2009 | Cullen | | G05B 17/02 318/561 |
| 2009/0099692 | A1 * | 4/2009 | Prisco | | A61B 19/22 700/254 |
| 2011/0160904 | A1 * | 6/2011 | Prisco | | A61B 19/22 700/254 |
| 2011/0285340 | A1 * | 11/2011 | Takeuchi | | G05B 19/404 318/632 |
| 2013/0173026 | A1 * | 7/2013 | Kawana | | G05B 19/416 700/30 |
| 2015/0155793 | A1 * | 6/2015 | Chen | | H02M 1/12 363/37 |
| 2015/0288310 | A1 * | 10/2015 | Pace | | H02P 6/08 318/400.02 |
| 2016/0004248 | A1 * | 1/2016 | Oda | | G05B 19/19 700/170 |
| 2016/0012845 | A1 * | 1/2016 | Nicholls | | G11B 19/28 360/73.03 |

\* cited by examiner

—— State transition during input of maximum manipulated variable (positive saturated value)$\tau_{max}$ ······ State transition during input of minimum manipulated variable (negative saturated value)$\tau_{min}$ Position deviation $\theta_{err} := \theta_R - \theta_M$ $v_{err} = u_M/D_M$ (Negative-direction input)

Velocity deviation $v_{err} := 0 - v_M$ $v_{err} = u_M/D_M$ (Positive-direction input)

Line expressing value in which velocity does not increase any more by canceling out output torque and viscous friction each other

CONTROL DEVICE, CONTROL METHOD, INFORMATION PROCESSING PROGRAM, AND RECORDING MEDIUM

CROSS-REFERENCE TO RELATED APPLICATION

This application is based on Japanese Patent Application No. 2016-048952 filed with the Japan Patent Office on Mar. 11, 2016 and Japanese Patent Application No. 2015-226721 filed with the Japan Patent Office on Nov. 19, 2015, the entire contents of which are incorporated herein by reference.

FIELD

The present invention relates to a model following control device that controls drive of a motor.

BACKGROUND

Conventionally there is known a servo motor control device that implements model following control. For example, Japanese Patent Unexamined Publication No. 8-168280 (published on Jun. 25, 1996) discloses a control device that, in control of a model (a servo motor as a reference model) used to implement model following control on a servo motor, implements proportional-integral-derivative (PID) control such that a position and a velocity of a model follow an externally input position command value and an externally input velocity command value.

However, in the conventional technique, in the case that the torque output from the model exceeds the maximum torque that can be output from the servo motor, a feedback controller cannot follow an orbit output from the model, so that problems such as overshoot and hunting occur.

When the torque output from the model exceeds the maximum torque that can be output from the servo motor, the servo motor cannot follow a torque value of the model. Therefore, in order to limit the torque output from the model, it is conceivable that a torque limiter is provided such that a torque command value provided to the servo motor does not exceed the maximum torque that can be output from the servo motor. However, in the configuration, although the torque output from the model is limited, position followability and velocity followability are not ensured due to the torque limitation, so that a deviation increases. Therefore, for example, even if the position of the servo motor comes close to target position to decrease the velocity command, the model output torque is kept large in order to solve the increased deviation, and the overshoot and the hunting occur in the orbit output from the model. Resultantly, there is a possibility that the overshoot and the hunting occur in the real control target (for example, the servo motor).

Accordingly, in the conventional technique of controlling the model using the PID control, when a user uses the servo motor control device that implements the model following control, it is necessary that the user provide the position command value while being conscious of the maximum torque that can be output from the servo motor.

SUMMARY

An object of the present invention is to provide a control device, a control method, and a program, by which a user can cause a servo motor to perform desired operation without occurrence of overshoot and hunting in the servo motor while being unconscious of a maximum torque that can be output from the servo motor.

According to one aspect of the present invention, a control device for a servo motor that operates a control target includes a feedforward controller configured to output a model position, a model velocity, and a model torque, based on a preset model of the control target, the model position, the model velocity, and the model torque being target values of a position, a velocity, and a torque of the servo motor. The feedforward controller includes a sliding mode controller configured to determine, based on a model position deviation that is a deviation between an externally input position command value and the model position and a model velocity deviation that is a deviation between a velocity command value and the model velocity, the model torque such that the model position deviation and the model velocity deviation converge onto a switching curve determined by a predetermined torque that can be output from the servo motor and a motion characteristic of a load machine driven by the servo motor.

According to the above configuration, the feedforward controller of the control device controls the model position, the model velocity, and the model torque by the sliding mode control. That is, the feedforward controller can generate the model orbit (the model position and the model velocity) that does not exceed the maximum torque that can be output from the servo motor. Accordingly, in the control device, the user can provide the position command to the feedforward controller without being conscious of the maximum torque that can be output from the servo motor, and cause the servo motor to perform the desired operation.

The feedforward controller of the control device controls the model position, the model velocity, and the model torque by the sliding mode control. Accordingly, in the control device, the model following control can be implemented using the model in which the overshoot and the hunting do not occur.

Additionally, the control device can avoid the problems such as the overshoot and the hunting (the overshoot and the hunting occur in the orbit output from the model), the problems being caused by a situation in which the feedback controller hardly follows the orbit output from the model because the model torque exceeds the maximum torque that can be output from the servo motor.

Preferably, the control device further includes a feedback controller configured to implement feedback control on the position and the velocity of the servo motor such that the position and the velocity of the servo motor follow the model position and the model velocity controlled by the feedforward controller.

According to the above configuration, in the control device, the feedforward controller controls the model position, the model velocity, and the model torque by the sliding mode control, and the feedback controller implements the feedback control (for example, the PID control) on the position and velocity of the servo motor such that the position and velocity of the servo motor follow the model position and the model velocity.

In the case that the feedback controller implements the sliding mode control, the hunting may occur with respect to the torque of the servo motor.

However, in the control device, the feedback controller implements the PID control, so that the occurrence of the hunting can be avoided with respect to the torque of the servo motor.

Preferably, in the control device, the motion characteristic is inertia moment of the load machine, and the switching curve is defined as a quadratic curve in a plane defined with the model position deviation and the model velocity deviation.

According to the above configuration, the control device can implement the sliding mode control determining the model torque such that the model position deviation and the model velocity deviation converge onto the switching curve determined by the predetermined torque that can be output from the servo motor and the inertia moment of the load machine, and such that the model position deviation and the model velocity deviation converge to zero.

Preferably, in the control device, the motion characteristic is inertia moment of the load machine and a viscosity coefficient, and the switching curve is defined as a sum of a logarithmic curve and a straight line in a plane defined with the model position deviation and the model velocity deviation.

According to the above configuration, the control device can implement the sliding mode control determining the model torque such that the model position deviation and the model velocity deviation converge onto the switching curve determined by the predetermined torque that can be output from the servo motor and the inertia moment of the load machine and the viscosity coefficient, and such that the model position deviation and the model velocity deviation converge to zero.

Preferably, in the control device, the velocity command value is zero.

According to the above configuration, in the control device, because the velocity command value is zero, the model velocity also becomes zero at a point of time the position of the servo motor arrives at the target position, and the model position does not overshoot.

Preferably, in the control device, the predetermined torque that can be output from the servo motor that determines the switching curve is smaller than a maximum torque that can be output from the servo motor.

According to the above configuration, the control device can cause the servo motor to follow the model position, the model velocity, and the model torque, which are controlled while a load applied to the servo motor is suppressed.

Preferably, in the control device, the model velocity is less than a maximum output velocity of the servo motor.

According to the above configuration, in the control device, the model velocity controlled by the feedforward controller is less than the maximum output velocity of the servo motor.

When the model velocity is set larger than the maximum output velocity of the servo motor, the actual servo motor cannot follow, but a control behavior of the model becomes different.

In the control device, the model velocity is less than the maximum output velocity of the servo motor, so that the control device can implement the model following control on the servo motor using the model that can be followed by the servo motor.

Preferably, the control device further includes a torque corrector configured to correct the predetermined torque, based on an actual driving state of the control target or a state of the model of the control target. The sliding mode controller determines the model torque using a predetermined torque corrected by the torque corrector.

According to the above configuration, the sliding mode controller can determine the model torque that the actual servo motor easily follows. Resultantly, stability of the behavior of the servo motor is improved.

The torque corrector corrects the predetermined torque, based on a real velocity or the model velocity of the servo motor.

For example, the torque corrector obtains an amount of torque decreased due to at least one of a number of revolutions/torque (NT) characteristic, dynamic friction, and viscous friction, based on the real velocity or the model velocity of the servo motor, and corrects the predetermined torque by subtraction of the amount of decreased torque.

Alternatively, the torque corrector obtains an amount of torque decreased due to an unbalanced load generated in operating the control target, and corrects the predetermined torque by subtraction of the amount of decreased torque.

According to the above configuration, the predetermined torque is corrected by performing the subtraction of the amount of decreased torque in consideration of, for example, the NT characteristic, the dynamic friction, the viscous friction, and the unbalanced load. Therefore, the torque can be set according to the state of the servo motor, and the followability can be improved with respect to the model torque output from the sliding mode controller.

According to another aspect of the present invention, a control method for controlling a servo motor that implements model following control includes: a feedforward control step of controlling a model position, a model velocity, and a model torque, which are target values of a position, a velocity, and a torque of the servo motor; and a feedback control step of causing the position and the velocity of the servo motor to follow the model position and the model velocity controlled in the feedforward control step. The feedforward control step includes a sliding mode control step of implementing sliding mode control to determine, based on a model position deviation that is a deviation between an externally input position command value and the model position and a model velocity deviation that is a deviation between a velocity command value and the model velocity, the model torque such that the model position deviation and the model velocity deviation converge onto a switching curve determined by a predetermined torque that can be output from the servo motor and a motion characteristic of a load machine driven by the servo motor.

According to the above configuration, in the feedforward control step of the control method, the model position, the model velocity, and the model torque are controlled by the sliding mode control. That is, the model orbit (the model position and the model velocity) that does not exceed the maximum torque that can be output from the servo motor can be generated in the feedforward control step. Accordingly, in the control method, the user can provide the position command to the feedforward control step without being conscious of the maximum torque that can be output from the servo motor, and cause the servo motor to perform the desired operation.

In the feedforward control step of the control method, the model position, the model velocity, and the model torque are controlled by the sliding mode control. Accordingly, in the control method, the model following control can be implemented using the model in which the overshoot and the hunting do not occur.

Additionally, the control method can avoid the problems such as the overshoot and the hunting (the overshoot and the hunting occur in the orbit output from the model), the problems being caused by a situation in which the feedback control step hardly follows the orbit output from the model because the model torque exceeds the maximum torque that can be output from the servo motor.

According to one aspect of the present invention, with respect to the servo motor controlling device and the like, the user can cause the servo motor to perform the desired operation without occurrence of the overshoot and the hunting in the servo motor while being unconscious of the maximum torque that can be output from the servo motor.

BRIEF DESCRIPTION OF THE DRAWINGS

FIG. 12A is a view before the control device includes a torque corrector, and FIG. 12B is a view after the control device includes the torque corrector;

FIG. 13A is a view before the control device includes the torque corrector, and FIG. 13B is a view before the control device includes the torque corrector;

FIG. 14A is a view before the control device includes the torque corrector, and FIG. 14B is a view before the control device includes the torque corrector;

DETAILED DESCRIPTION

First Embodiment

Figure 1:
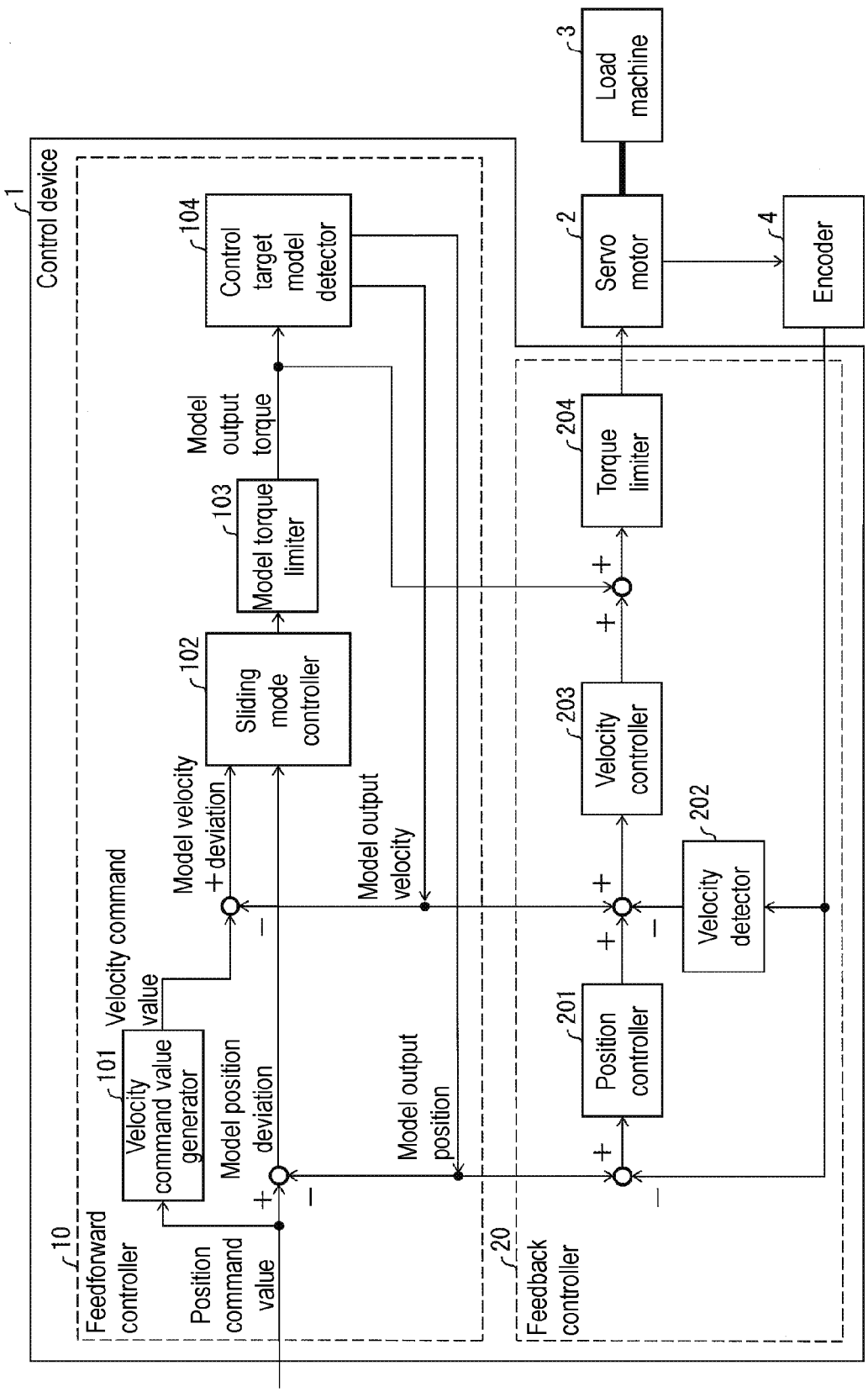
FIG. 1 is a block diagram illustrating a configuration of a main portion of a control device according to a first embodiment of the present invention.

Hereinafter, a first embodiment of the present invention will be described in detail with reference to FIGS. 1 to 9. In the drawings, the identical or equivalent component is designated by the identical symbol, and the repetitive description thereof will not be given. In order to facilitate understanding of a control device 1 of the first embodiment, a conventional control device 9 will be described with reference to FIG. 10.

Outline of Conventional Control Device

Figure 10:
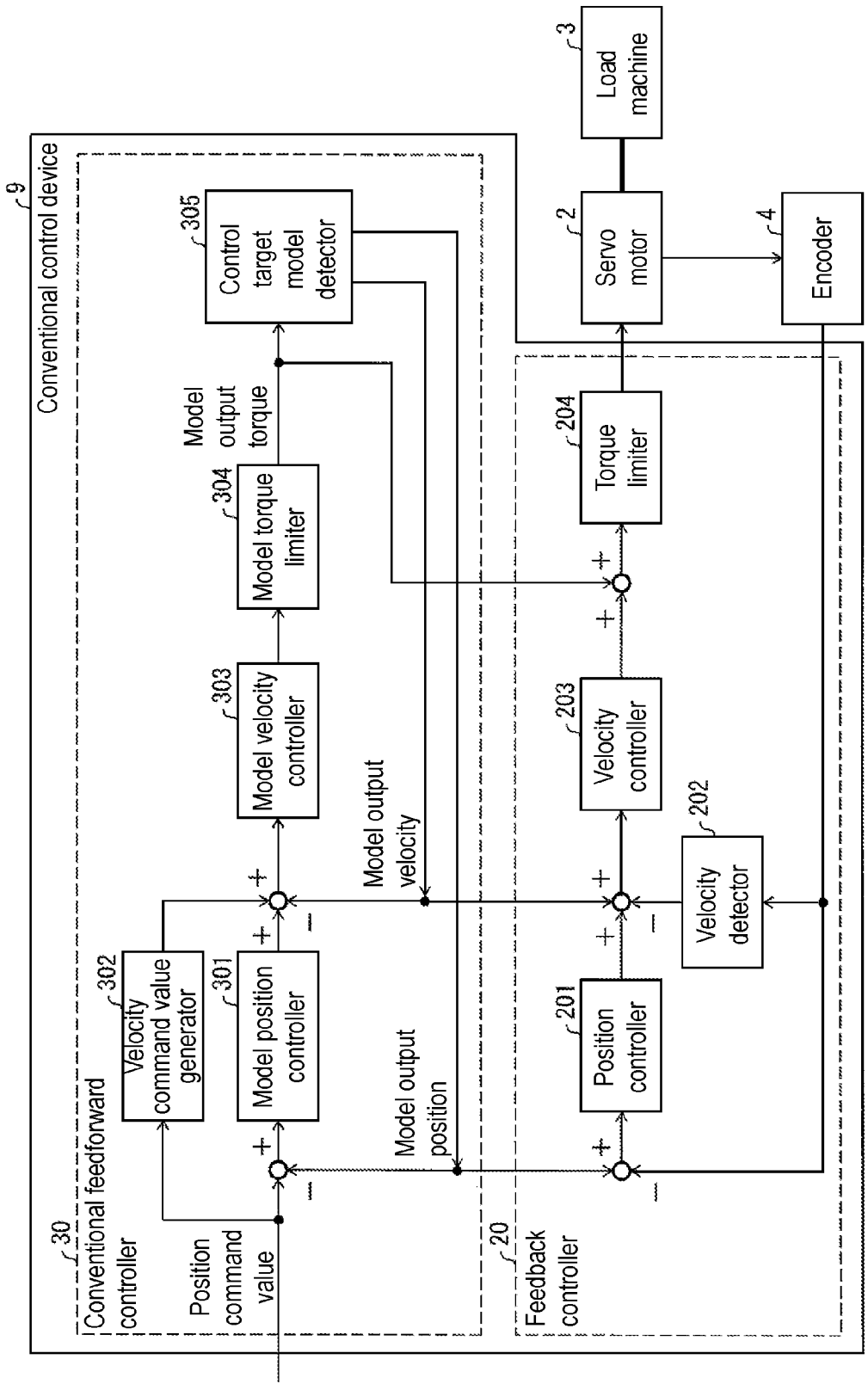
FIG. 10 is a view illustrating an outline of a conventional control device.

FIG. 10 is a view illustrating an outline of the conventional control device 9. As illustrated in FIG. 10, the control device 9 implements the model following control on a servo motor 2. FIG. 10 also illustrates a load machine 3 driven by the servo motor 2 and an encoder 4 that detects a position of the servo motor 2, for example, a rotation angle of the servo motor 2. The encoder 4 transmits the detected position to a feedback controller 20. Specifically, a position of the servo motor 2 detected by the encoder 4 is input to a position controller 201 and a velocity detector 202 of the feedback controller 20. The encoder 4 may detect a velocity of the servo motor 2, and transmit the detected velocity to the feedback controller 20. In such cases, the feedback controller 20 needs not to include the velocity detector 202 that calculates the velocity of the servo motor 2 from the position of the servo motor 2 detected by the encoder 4.

The conventional control device 9 includes a conventional feedforward controller 30 and the feedback controller 20. The conventional feedforward controller 30 controls a model output position $\theta_M$, a model output velocity $v_M$, and a model output torque, which are target values of the position, velocity, and torque of the servo motor 2, namely, controls a model (reference model) of the servo motor 2. The conventional feedforward controller 30 implements the PID control on the model of the servo motor 2. That is, the conventional feedforward controller 30 implements the PID control on the model output position $\theta_M$ that is the target position of the model and the model output velocity $v_M$ that is the target velocity of the model such that the model output position $\theta_M$ and the model output velocity $v_M$ follow a position command value $\theta_R$ provided from an outside (for example, from a user) and a velocity command value $v_R$ generated from the position command value $\theta_R$. The conventional feedforward controller 30 includes a model position controller 301, a velocity command generator 302, a model velocity controller 303, a model torque limiter 304, and a control target model detector 305.

The model position controller 301 receives the position command value $\theta_R$ and the model output position $\theta_M$ generated from control target model detector 305, and generates a model velocity control command, which implements control such that model output position $\theta_M$ follows the position command value $\theta_R$. The model position controller 301 outputs the generated model velocity control command to the model velocity controller 303 and the feedback controller 20.

The velocity command generator 302 receives the position command value $\theta_R$, and generates the velocity command value $v_R$ from the position command value $\theta_R$. The velocity command generator 302 outputs the generated velocity command value $v_R$ to the model velocity controller 303.

The model velocity controller 303 receives the model velocity control command generated by the model position controller 301, the velocity command value $v_R$ generated by the velocity command generator 302, and the model output velocity $v_M$ generated by the control target model detector 305. The model velocity controller 303 generates a model torque control command, which implement control such that the model output velocity $v_M$ follows the model velocity control command and the velocity command value $v_R$. The model velocity controller 303 outputs the generated model torque control command to the model torque limiter 304.

The model torque limiter 304 controls (outputs) the model output torque based on the model torque control command generated by the model velocity controller 303. The control target model detector 305 and the feedback controller 20 are notified of the model output torque controlled by the model torque limiter 304.

The control target model detector 305 receives the model output torque controlled by the model torque limiter 304, generates the model output position $\theta_M$ and the model output velocity $v_M$, and outputs the generated model output position $\theta_M$ and model output velocity $v_M$. That is, the model position controller 301 and the feedback controller 20 are notified of the model output position $\theta_M$ generated by the control target model detector 305. The model velocity controller 303 and the feedback controller 20 are notified of the model output velocity $v_M$ generated by the control target model detector 305.

The feedback controller 20 implements the PID control on the position, velocity, and torque of the servo motor 2 such that the position, velocity, and torque of the servo motor 2 follow the model output position $\theta_M$, model output velocity $v_M$, and model output torque, which are controlled by the feedforward controller 30. The feedback controller 20 includes the position controller 201, the velocity detector 202, a velocity controller 203, and a torque limiter 204.

The position controller 201 receives the position of the servo motor 2 detected by the encoder 4 and the model output position $\theta_M$ generated by the control target model detector 305, and generates a velocity control command, which implements control such that the detected position of the servo motor 2 follows the model output position $\theta_M$. The position controller 201 outputs the generated velocity control command to the velocity controller 203.

The velocity detector 202 calculates the velocity of the servo motor 2 from the position of the servo motor 2 detected by the encoder 4, and outputs the calculated velocity of the servo motor 2 to the velocity controller 203.

The velocity controller 203 receives the velocity control command generated by the position controller 201, the model output velocity generated by the control target model detector 305, and the velocity (the velocity of the servo motor 2) calculated by the velocity detector 202. The velocity controller 203 generates a torque control command such that the velocity of the servo motor 2 calculated by the velocity detector 202 follows the velocity control command and the model output velocity, and outputs the generated torque control command to the torque limiter 204.

The torque limiter 204 controls the servo motor 2 based on the torque control command generated by velocity controller 203 and the model output torque generated by the control target model detector 305.

In the feedforward controller 30, because the PID control is implemented on the model, when a model orbit is generated by respect to the position command value $\theta_R$, the torque (model output torque) necessary for the model orbit possibly exceeds a maximum torque that can be output from the servo motor 2. In the feedforward controller 30, when the torque value output from the model velocity controller 303 is larger than the maximum torque that can be output from the servo motor 2, the model torque limiter 304 limits the torque. Therefore, the model output torque becomes a value on which the model torque limiter 304 imposes a predetermined limitation. Thus, when the torque value output from the model velocity controller 303 is limited, the problems such as the overshoot and the hunting occur in the model orbit. In order to prevent the problem from occurring, it is necessary that torque (model output torque) necessary for the model orbit generated based on the position command value $\theta_R$ be less than or equal to the maximum torque that can be output from the servo motor 2. That is, it is necessary for the user to provide the position command value $\theta_R$, which is adjusted so as to generate the model orbit being able to be yielded by the torque (model output torque) less than or equal to the maximum torque that can be output from the servo motor 2.

Outline of Control Device of the First Embodiment

In summary, the control device 1 of the first embodiment includes a feedforward controller 10 that implements the sliding mode control on the model (reference model) of the servo motor 2 instead of the conventional feedforward controller 30 that implements the PID control on the model. Under the sliding mode control implemented by the feedforward controller 10, the control device 1 can control the servo motor 2 on the assumption of a predetermined torque (for example, the maximum torque that can be output from the servo motor 2) that can be output from the servo motor 2.

That is, the feedforward controller 10 of the control device 1 that implements the model following control on the servo motor 2 implements the sliding mode control such that a model position deviation that is a deviation between the externally input position command value $\theta_R$ and model output position $\theta_M$ (model position) and a model velocity deviation that is a deviation between the velocity command value $v_R$ and the model output velocity $v_M$ (model velocity) converge to "0" along a switching curve SL (switching plane). Although described in detail later, under the sliding mode control implemented by the feedforward controller 10, the model (reference model) of the servo motor 2 is controlled on the assumption of a predetermined torque that can be output from the servo motor 2 (for example, the maximum torque that can be output from the servo motor 2). Accordingly, the user can use the control device 1 to cause the servo motor 2 to perform the desired operation without the occurrence of the overshoot and the hunting while being unconscious of the maximum torque that can be output from the servo motor 2.

An outline of the control device 1 different from the conventional control device 9 in the respects described above can be expressed as follows. That is, the control device 1 is a control device for the servo motor 2 that operates the control target (for example, the load machine 3). The control device 1 includes the feedforward controller 10 configured to output the model output position $\theta_M$ (model position), the model output velocity $v_M$ (model velocity), and the model output torque (model torque), based on a preset model of the control target, the model position, the model velocity, and the model torque being target values of a position, a velocity, and a torque of the servo motor. The feedforward controller 10 includes a sliding mode controller 102 configured to determine, based on the model position deviation that is the deviation between the externally input position command value $\theta_R$ and the model output position $\theta_M$ and the model velocity deviation that is the deviation between the velocity command value $v_R$ and the model output velocity $v_M$, the model output torque such that the model position deviation and the model velocity deviation converge onto the switching curve SL determined by a predetermined torque that can be output from the servo motor 2 (for example, the maximum torque that can be output from the servo motor 2) and the motion characteristic of the load machine 3 driven by the servo motor 2.

According to the above configuration, the feedforward controller 10 of the control device 1 controls the model output position $\theta_M$, the model output velocity $v_M$, and the model output torque by the sliding mode control. That is, the feedforward controller 10 can generate the model orbit (the model output position $\theta_M$ and the model output velocity $v_M$) that does not exceed the maximum torque that can be output from the servo motor 2. Accordingly, in the control device 1, the user can provide the position command to the feedforward controller 10 without being conscious of the maximum torque that can be output from the servo motor 2, and cause the servo motor 2 to perform the desired operation.

The feedforward controller 10 of the control device 1 controls the model output position $\theta_M$, the model output velocity $v_M$, and the model output torque by the sliding mode control. Accordingly, in the control device 1, the model following control can be implemented using the model in which the overshoot and the hunting do not occur.

Additionally, the control device 1 can avoid the problems such as the overshoot and the hunting (the overshoot and the hunting occur in the orbit output from the model), the problems being caused by a situation in which the feedback controller hardly follows the orbit output from the model because the output torque of the model velocity controller 303 is limited by the torque limiter 304.

The control device 1 further includes the feedback controller 20 that implements feedback control (for example, the PID control) on the position and the velocity of the servo motor 2 such that the position and the velocity of the servo motor 2 follow the model output position $\theta_M$ and the model output velocity $v_M$, which are controlled by the feedforward controller 10.

According to the above configuration, in the control device 1, the feedforward controller 10 controls the model output position $\theta_M$, the model output velocity $v_M$, and the model output torque by the sliding mode control, and the feedback controller 20 implements the feedback control (for example, the PID control) on the position and the velocity of the servo motor 2 so as to follow the model output position $\theta_M$ and the model output velocity $v_M$.

At this point, in the case that the feedback controller 20 implements the sliding mode control, the hunting can occur with respect to the torque of the servo motor 2.

However, in the control device 1, the feedback controller 20 implements the PID control, so that the occurrence of the hunting can be avoided with respect to the torque of the servo motor 2. The control device 1 of which the outline is described above will be described in detail below with reference to FIG. 1.

For example, the predetermined torque that can be output from the servo motor 2 that determines the switching curve SL is the maximum torque that can be output from the servo motor 2. However, the predetermined torque that can be output from the servo motor 2 that determines the switching curve SL is not necessarily the maximum torque that can be output from the servo motor 2. In the control device 1, the predetermined torque that can be output from the servo motor 2 that determines the switching curve SL is smaller than the maximum torque that can be output from the servo motor 2.

According to the above configuration, the control device 1 can cause the servo motor 2 to follow the model output position $\theta_M$, the model output velocity $v_M$, and the model output torque, which are controlled while the load applied to the servo motor 2 is suppressed.

Detailed Control Device of the First Embodiment

FIG. 1 is a block diagram illustrating a configuration of a main portion of the control device 1. The control device 1 implements the model following control on the servo motor 2. That is, the control device 1 includes the feedforward controller 10 that controls the model (reference model) of the servo motor 2 and the feedback controller 20 that controls the servo motor 2 such that the servo motor 2 follows the model of the servo motor 2 controlled by the feedforward controller 10.

The feedforward controller 10 controls the model output position $\theta_M$ (model position), model output velocity $v_M$ (model velocity), and model output torque (model torque), which are the target values of the position, velocity, and torque of the servo motor 2. At this point, the feedforward controller 10 implements the sliding mode control on the model output position $\theta_M$, model output velocity $v_M$, and model output torque, namely, the model (reference model) of the servo motor 2. Specifically, the feedforward controller 10 includes a velocity command generator 101, the sliding mode controller 102, a model torque limiter 103, and a control target model detector 104. The velocity command generator 101 receives the position command value $\theta_R$ provided from the outside (for example, from the user), and generates the velocity command value $v_R$ from the position command value $\theta_R$. The velocity command generator 101 outputs the generated velocity command value $v_R$.

The sliding mode controller 102 receives the position command value $\theta_R$, the velocity command value $v_R$ generated from the position command value $\theta_R$ by the velocity command generator 101, and the model output position $\theta_M$ and model output velocity $v_M$ that are generated by the control target model detector 104. More particularly, the sliding mode controller 102 receives the model position deviation that is the deviation between the position command value $\theta_R$ and the model output position $\theta_M$ and the model velocity deviation that is the deviation between the velocity command value $v_R$ and the model output velocity $v_M$. The sliding mode controller 102 controls (determines) the model output torque such that the model position deviation and the model velocity deviation converge onto the switching curve SL (switching plane). As used herein, the model output torque means a target value of the torque of the servo motor 2, and means a torque of the model (reference model) of the servo motor 2. The switching curve SL is determined by a predetermined torque that can be output from the servo motor 2 (for example, the maximum torque that can be output from the servo motor 2) and the motion characteristic of the load machine 3 driven by the servo motor 2. The switching curve SL will be described in detail later with reference to FIGS. 2 to 6.

The model torque limiter 103 outputs the model output torque based on the model output torque controlled by the sliding mode controller 102. The control target model detector 104 and the feedback controller 20 are notified of the model output torque output from the model torque limiter 103. The sliding mode controller 102 outputs positive and negative maximum values that can be output from the servo motor 2. Accordingly, the sliding mode controller 102 acts as a torque limiter because of its nature. Accordingly, the model torque limiter 103 of the first embodiment needs not to be provided.

The control target model detector 104 receives the model output torque output from the model torque limiter 103, generates the model output position $\theta_M$ and the model output velocity $v_M$, and outputs the generated model output position $\theta_M$ and model output velocity $v_M$. That is, the sliding mode controller 102 and the feedback controller 20 are notified of the model output position $\theta_M$ generated by the control target model detector 104. That is, the sliding mode controller 102 and the feedback controller 20 are notified of the model output velocity $v_M$ generated by the control target model detector 104. More particularly, the sliding mode controller 102 is notified of the model position deviation that is the deviation between the model output position $\theta_M$ and the position command value $\theta_R$, which are generated by the control target model detector 104. The sliding mode controller 102 is notified of the model velocity deviation that is the deviation between the model output velocity $v_M$ and the velocity command value $v_R$, which are generated by the control target model detector 104.

The feedback controller 20 included in the control device 1 is similar to the feedback controller 20 included in the conventional control device 9. That is, the feedback controller 20 of the control device 1 implements the PID control on the position, velocity, and torque of the servo motor 2 such that the position, velocity, and torque of the servo motor 2 follow the model output position $\theta_M$, model output velocity $v_M$, and model output torque, which are controlled by the feedforward controller 10. Because each functional block of the feedback controller 20 is already described above, the detailed description is omitted.

Figure 7:
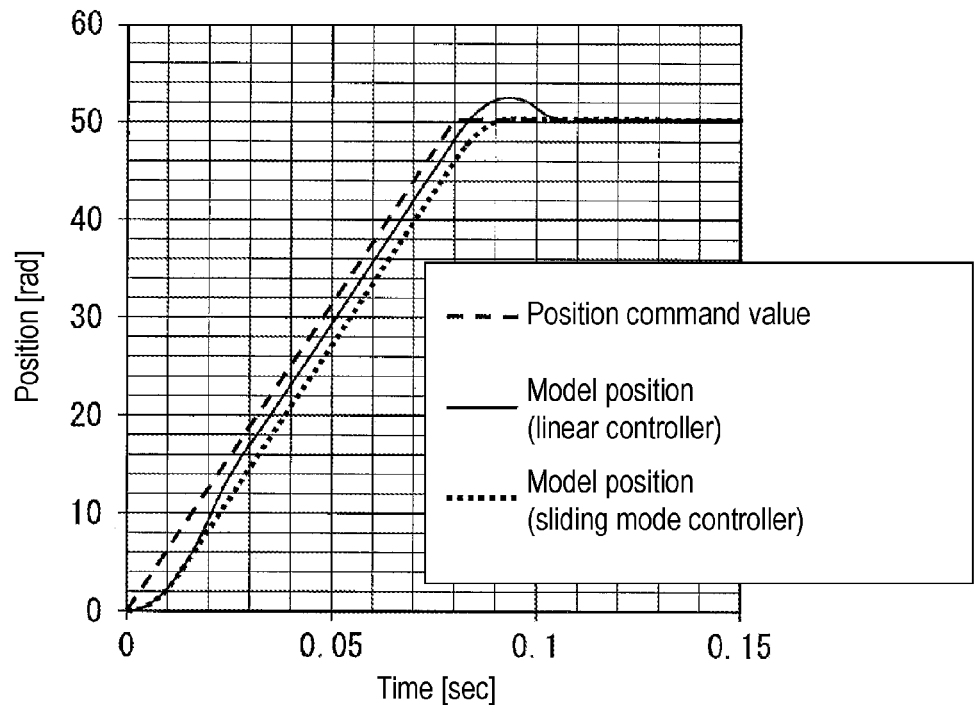
FIG. 7 is a view illustrating the locus of the model output position when the velocity command is set to "0" with respect to the sliding mode control implemented by the control device in FIG. 1.

That is, under the sliding mode control implemented by the feedforward controller 10 that generates the model orbit for the model following control, the control device 1 can generate the model orbit that does not exceed a predetermined torque that can be output from the servo motor 2 (for example, the maximum torque that can be output from the servo motor 2). The sliding mode controller 102 outputs the torque value to be provided to the servo motor 2 based on the model velocity and model position, which are output from the control target model detector. At this point, the model velocity and the model position are ideal values according to the designed model. In the model velocity and the model position, a rapid change of the value is rarely generated compared with the velocity and position, which are fed back by the actual operation of the load machine 3. Because the sliding mode controller 102 outputs the torque value based on the model velocity and the model position, a behavior of the torque value output from the sliding mode controller 102 compared with the case that the sliding mode controller 102 is disposed in the feedback controller 20. Resultantly, the overshoot and the hunting do not occur in the servo motor 2 controlled by the control device 1. Although described in detail later, the model output position $\theta_M$ controlled by the control device 1 converges without the occurrence of the overshoot and the hunting as illustrated in FIG. 7. FIG. 7 illustrates the switching curve SL that is a quadratic curve, and FIG. 7 illustrates a locus of the model output position $\theta_M$ in the case that the velocity command value $v_R$ received by the sliding mode controller 102 is set to "0". The switching curve SL in FIG. 7 will be described in detail later.

A control method (a method for controlling the servo motor 2) performed by the control device 1 described in detail can be summarized as follows. That is, the control method performed by the control device 1 is a control method for controlling the servo motor 2 that implements the model following control. The control method includes: a feedforward control step of controlling the model output position $\theta_M$, model output velocity $v_M$, and model output torque, which are target values of the position, velocity, and torque of the servo motor 2; and a feedback control step of causing the position and the velocity of the servo motor 2 to follow the model output position $\theta_M$ and the model output velocity $v_M$ controlled in the feedforward control step. The feedforward control step includes a sliding mode control step of implementing sliding mode control to determine, based on the model position deviation that is the deviation between the externally input position command value $\theta_R$ and the model output position $\theta_M$ and the model velocity deviation that is the deviation between the velocity command value $v_R$ and the model output velocity $v_M$, the model output torque (model torque) such that the model position deviation and the model velocity deviation converge onto the switching curve SL determined by a predetermined torque that can be output from the servo motor 2 (for example, the maximum torque that can be output from the servo motor 2) and the motion characteristic of the load machine 3 driven by the servo motor 2.

According to the above configuration, in the feedforward control step of the control method, the model output position $\theta_M$, the model output velocity $v_M$, and the model output torque are controlled by the sliding mode control. That is, the model orbit (the model output position $\theta_M$ and the model output velocity $v_M$) that does not exceed the maximum torque that can be output from the servo motor 2 can be generated in the feedforward control step. Accordingly, in the control method, the user can provide the position command to the feedforward control step without being conscious of the maximum torque that can be output from the servo motor 2, and cause the servo motor 2 to perform the desired operation.

In the feedforward control step of the control method, the model output position $\theta_M$, the model output velocity $v_M$, and the model output torque are controlled by the sliding mode control. Accordingly, in the control method, the model following control can be implemented using the model in which the overshoot and the hunting do not occur.

Additionally, the control method can avoid the problems such as the overshoot and the hunting (the overshoot and the hunting occur in the orbit output from the model), the problems being caused by the situation in which the feedback control step hardly follows the orbit output from the model because the model output torque exceeds the maximum torque that can be output from the servo motor 2.

The sliding mode control implemented on the model of the servo motor 2 by the feedforward controller 10 will be described in detail below by reference to FIG. 2.

Sliding Mode Control

Figure 2:
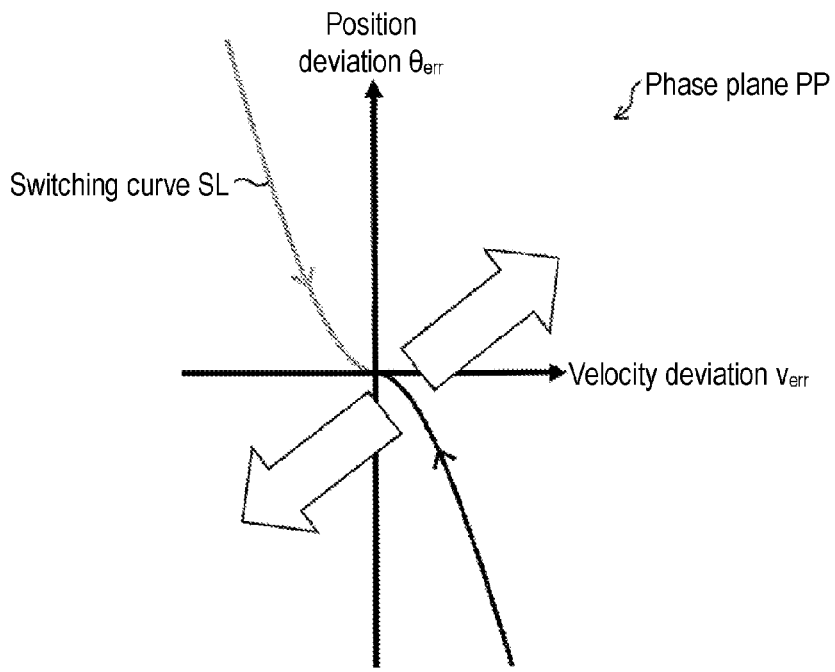
FIG. 2 is a view illustrating the sliding mode control implemented by the control device in FIG. 1.

FIG. 2 is a view illustrating the sliding mode control implemented by the sliding mode controller 102. As illustrated in FIG. 2, with a velocity deviation $v_{err}$ and a position deviation $\theta_{err}$ as the input, the sliding mode controller 102 determines the model output torque based on which one of the sides of the switching curve SL (switching plane) in FIG.

2 a point determined by the input velocity deviation $v_{err}$ and the position deviation $\theta_{err}$ is located on.

The switching curve SL is designed as the orbit that leads to an origin (that is, the position where both the position deviation $\theta_{err}$ and the velocity deviation $v_{err}$ become "0") when the servo motor 2 outputs the positive predetermined torque negative maximum torque or the negative predetermined torque (for example, the positive maximum torque that can be output from the servo motor 2, or the negative maximum torque).

As illustrated in FIG. 2, the switching curve SL (switching plane) expressed by the velocity deviation $v_{err}$ and position deviation $\theta_{err}$ is drawn on a phase plane PP in which the horizontal axis indicates the velocity deviation $v_{err}$ while the vertical axis indicates the position deviation $\theta_{err}$. In the case that the point indicating the input is located on an upper-right side of the switching curve SL when a given input (the velocity deviation $v_{err}$ and position deviation $\theta_{err}$ received by the sliding mode controller 102) is plotted on the phase plane PP, the sliding mode controller 102 outputs positive predetermined torque that can be output from the servo motor 2 (for example, the maximum torque that can be output from the servo motor 2). In the case that the point indicating the input is located on a lower-left side of the switching curve SL on the phase plane PP, the sliding mode controller 102 outputs the negative predetermined torque that can be output from the servo motor 2 (for example, the minimum torque that can be output from the servo motor 2, namely, the negative maximum torque). In the case that the point indicating the input is located on the switching curve SL, the sliding mode controller 102 outputs the negative maximum torque in the second quadrant, and the sliding mode controller 102 outputs the positive maximum torque in the fourth quadrant. Therefore, both the position deviation and the velocity deviation converge toward the origin.

The sliding mode control implemented by the sliding mode controller 102 is described above with reference to FIG. 2. The switching curve SL (switching plane) used in the sliding mode control is determined by the predetermined torque that can be output from the servo motor 2 and the motion characteristic of the load machine 3 driven by the servo motor 2.

At this point, the inertia moment (inertia) and the viscosity coefficient (viscous friction) of the load machine 3 are regarded as the motion characteristic of the load machine 3. A difference of the switching curve SL between the case that only the inertia moment of the load machine 3 is regarded as the motion characteristic of the load machine 3 and the case that the inertia moment and the viscosity coefficient of the load machine 3 will be described below with reference to FIG. 3.

Derivation of Switching Curve

Figure 3:
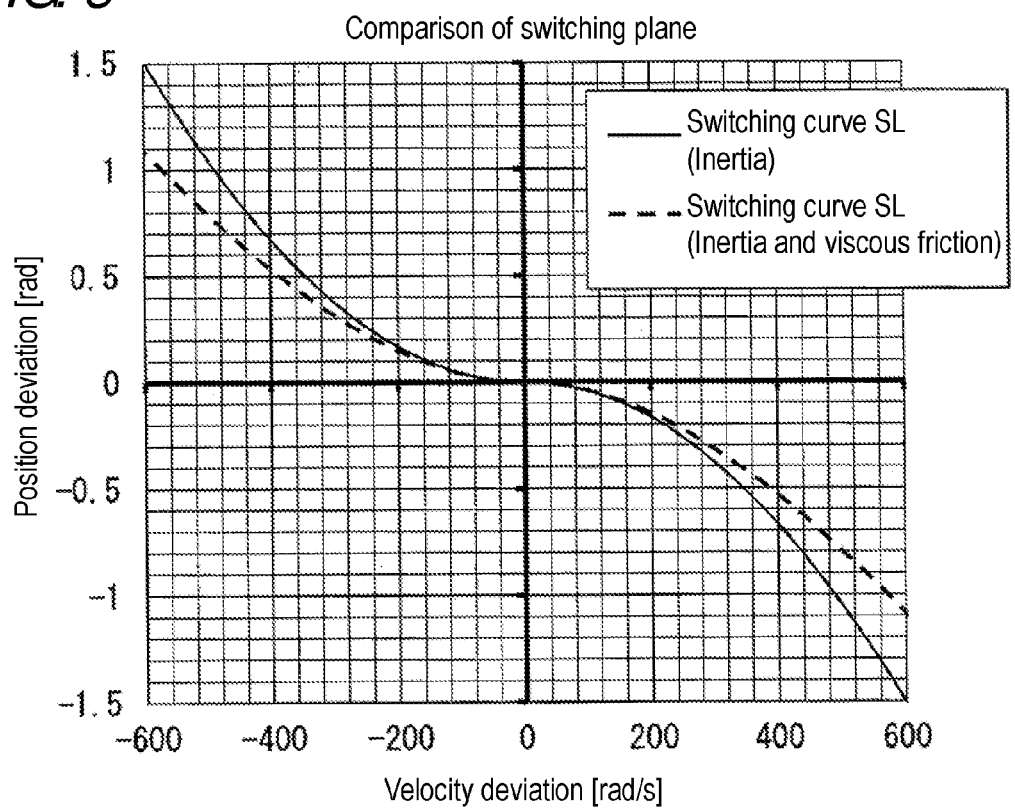
FIG. 3 is a view illustrating comparison between a switching curve of the case that only inertia moment of a load machine is regarded as a motion characteristic of the load machine and a switching curve of the case that the inertia moment and a viscosity coefficient of the load machine are regarded as the motion characteristic of the load machine in the control device of FIG. 1.

FIG. 3 is a view illustrating comparison between the switching curve SL of the case that only to inertia moment of the load machine 3 is regarded as the motion characteristic of the load machine 3 and the switching curve SL of the case that the inertia moment and the viscosity coefficient of the load machine 3 are regarded as the motion characteristic of the load machine 3 in the control device 1. In the case that only the inertia moment is regarded as the load machine model (the motion characteristic of the load machine 3), the switching curve SL (switching plane) can be represented by a quadratic curve in the phase plane PP in which a horizontal axis indicates the velocity deviation $v_{err}$ while a vertical axis indicates the position deviation $\theta_{err}$. In the case that the inertia moment and the viscous friction are regarded as the load machine model, the switching curve SL can be represented as a sum of a logarithmic curve and a straight line in the phase plane PP. The detailed description will be made below.

Only Inertia Moment

First, the case that only the inertia moment of the load machine 3 is regarded as the motion characteristic (load machine model) of the load machine 3, which is one of factors to determine the switching curve SL in the control device 1 will be described below. In the case that only the inertia moment of the load machine 3 is regarded as the load machine model, the switching curve SL is defined as the quadratic curve in the phase plane PP (the plane defined by the model position deviation and the model velocity deviation) in which a horizontal axis indicates the velocity deviation $v_{err}$ while a vertical axis indicates the position deviation $\theta_{err}$.

In the case that only the inertia moment of the load machine 3 is regarded as the load machine model, the control device 1 can implement the sliding mode control determining the model output torque such that the model position deviation and the model velocity deviation converge onto the switching curve SL determined by the predetermined torque that can be output from the servo motor 2 and the inertia moment of the load machine 3, and such that the model position deviation and the model velocity deviation converge to zero.

In the case that only the inertia moment of the load machine 3 is regarded as the load machine model (load machine model) of the load machine 3, because the control target of the feedforward controller 10 (sliding mode controller 102) that implements the sliding mode control is a single inertia model, output $u_{sat}$ of a saturation controller is kept constant unless the manipulated variable of the saturation controller is switched. Therefore, the behavior of the model becomes uniformly accelerated motion represented by the following numerical expression 1.

$$v_{err}(t) := V_R - v_M(t) = \qquad (1)$$
$$-\frac{u_{sat}}{J_M}t + v_{err}(0) \to t = \frac{J_M}{u_{sat}}\{-v_{err}(t) + v_{err}(0)\} \; (s.t. \; u_{sat} \neq 0)$$

In the numerical expression 1, $v_{err}(t)$, $v_R$, and $v_M(t)$ respectively represent the velocity deviation, the target velocity (velocity command value), and the model output velocity, and $J_M$ represents the model inertia. When time integration is performed on the velocity deviation of the numerical expression 1, "position deviation $\theta_{err}(t):=\theta_R-\theta_M(t)$" can be obtained by the following numerical expression 2.

$$\theta_{err}(t) = \int_0^t v_{err}(t)\,dt + \theta_{err}(0) \qquad (2)$$
$$= -\frac{u_{sat}}{2J_M}\left\{t - \frac{J_M v_{err}(0)}{u_{sat}}\right\}^2 + \frac{u_{sat}}{2J_M}\left\{\frac{J_M v_{err}(0)}{u_{sat}}\right\}^2 + \theta_{err}(0)$$

When t is deleted from the numerical expressions 1 and 2 to express the position deviation $\theta_{err}$ in terms of a velocity deviation $v_{err}(t)$, the following numerical expression 3 is obtained.

$$\theta_{err} := \theta_R - \theta_M(t) = -\frac{J_M}{2u_{sat}}\{v_{err}(t)\}^2 + \frac{J_M}{2u_{sat}}\{v_{err}(0)\}^2 + \theta_{err}(0) \qquad (3)$$

In the numerical expression 3, $\theta_R$ and $\theta_M(t)$ respectively represent the target position (position command value) and the model output position. As can be seen from the numerical expression 3, in the case that a maximum manipulated variable (positive saturated value) and a minimum manipulated variable (negative saturated value) are input, the state shifts as illustrated in FIG. 4 from any initial state [$\theta_{err}(0)$, $v_{err}(0)$].

Figure 4:
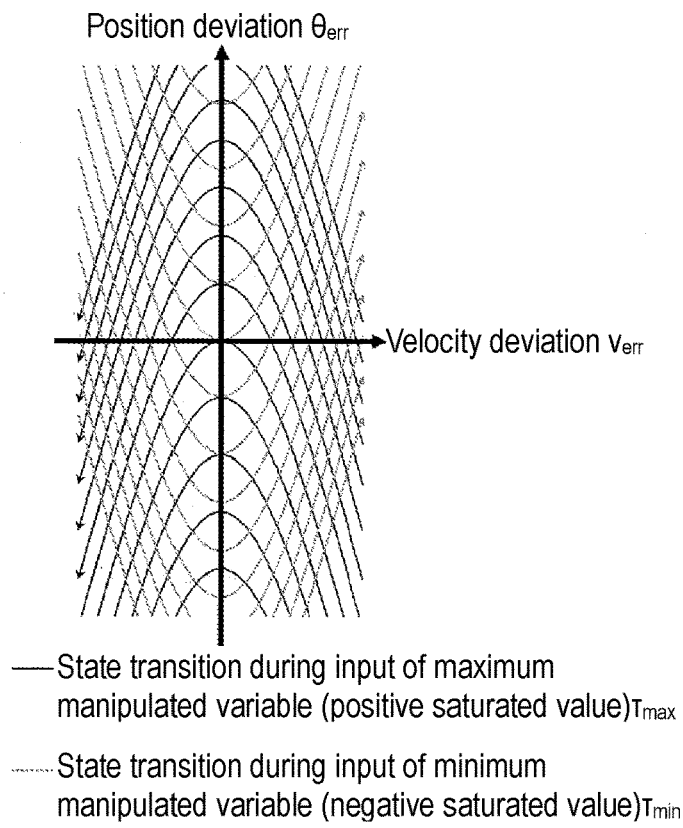
FIG. 4 is a view illustrating a state transition during input of a maximum manipulated variable and a state transition during input of a minimum manipulated variable in the case that the only inertia moment of the load machine is regarded as the motion characteristic of the load machine.

FIG. 4 is a view illustrating the state transition during the input of the maximum manipulated variable and the state transition during the input of the minimum manipulated variable in the case that only the inertia moment of the load machine 3 is regarded as the motion characteristic of the load machine 3. In FIG. 4, an upwardly convex curve group indicates a state transition in the case that the maximum manipulated variable (positive saturated value) is input, and a downwardly convex curve group indicates a state transition in the case that the minimum manipulated variable (negative saturated value) is input. When the switching curve SL that converges to an origin from any initial state at one switching time in FIG. 4, a curve in FIG. 5 can be drawn.

Figure 5:
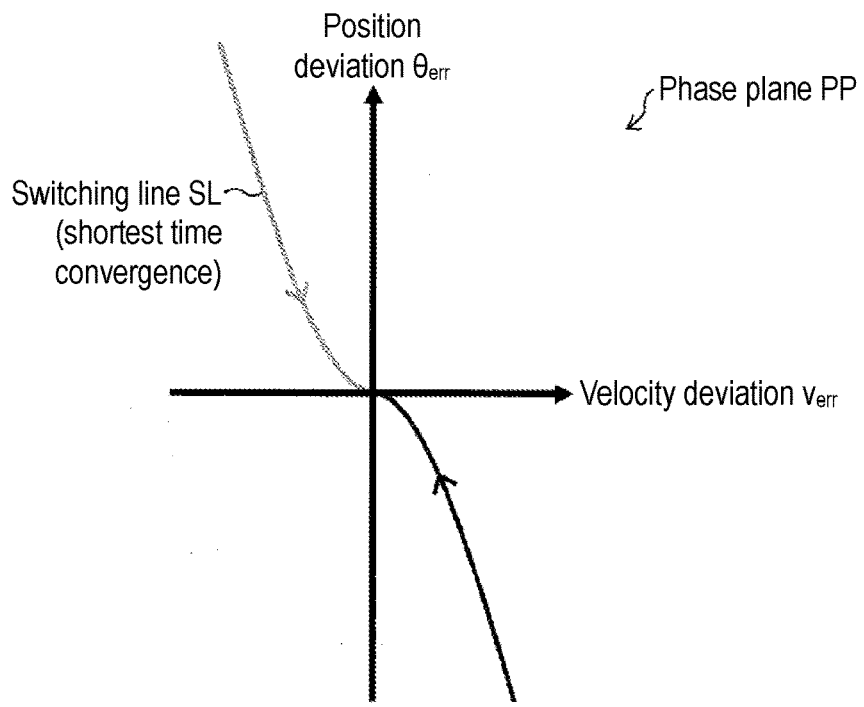
FIG. 5 is a view illustrating a shortest time convergence switching curve for sliding mode control implemented by the control device in FIG. 1.

FIG. 5 is a view illustrating a shortest time convergence switching curve SL for the sliding mode control implemented by the control device 1. In FIG. 5, $\sigma(\theta_{err}, v_{err})$ indicating the switching curve SL enabling the shortest time convergence is represented by the following numerical expression 4.

$$\sigma(\theta_{err}, v_{err}) := \begin{cases} \theta_{err} + \dfrac{J_M}{2\tau_{max}} v_{err}^2 = 0 & (v_{err} \geq 0) \\ \theta_{err} + \dfrac{J_M}{2\tau_{min}} v_{err}^2 = 0 & (v_{err} < 0) \end{cases} \quad (4)$$

Using the switching curve SL enabling the shortest time convergence (that is, the switching curve SL represented by the numerical expression 4), the output $u_{sat}$ of the saturation controller is fixed by the following numerical expression 5 according to a position deviation $\theta err(t0)$ and a velocity deviation $verr(t0)$ at a current clock time t0 during the control.

$$u_{sat} := \begin{cases} \tau_{max} & [\sigma\{\theta_{err}(t_0), v_{err}(t_0)\} > 0] \\ \tau_{min} & [\sigma\{\theta_{err}(t_0), v_{err}(t_0)\} < 0] \end{cases} \quad (5)$$

Therefore, any initial state can converge onto the switching curve SL without switching the manipulated variable. For "$\sigma=0$" that is on the switching curve SL, the output $u_{sat}$ of the saturation controller is fixed as illustrated in the following numerical expression 6.

$$u_{sat} := \begin{cases} \tau_{max} & [\sigma\{\theta_{err}(t_0), v_{err}(t_0)\} = 0 \cap v_{err} \geq 0] \\ \tau_{min} & [\sigma\{\theta_{err}(t_0), v_{err}(t_0)\} = 0 \cap v_{err} < 0] \end{cases} \quad (6)$$

As described above, the output $u_{sat}$ of the saturation controller is fixed, and the manipulated variable is switched only once, which allows any initial state to converge to the origin.

The switching curve SL (switching plane) is described above in the case that only the inertia moment Load machine is regarded as the load machine model (the motion characteristic of the load machine 3). The switching curve SL in the case that the inertia moment and the viscous friction are regarded as the load machine model will be described below.

Inertia Moment and Viscous Friction

The case that the inertia moment and the viscosity coefficient of the load machine 3 are regarded as the motion characteristic (load machine model) of the load machine 3, which is one of factors to determine the switching curve SL in the control device 1 will be described below. In the case that the inertia moment and the viscosity coefficient of the load machine 3 are regarded as the load machine model, the switching curve SL is defined as the sum of the logarithmic curve and the straight line in the phase plane PP (the plane defined by the model position deviation and the model velocity deviation) in which a horizontal axis indicates the velocity deviation $v_{err}$ while a vertical axis indicates the position deviation $\theta_{err}$.

In the case that the inertia moment and the viscosity coefficient of the load machine 3 are regarded as the load machine model, the control device 1 can implement the sliding mode control determining the model output torque such that the model position deviation and the model velocity deviation converge onto the switching curve SL determined by the predetermined torque that can be output from the servo motor 2 and the inertia moment and the viscosity coefficient of the load machine 3, and such that the model position deviation and the model velocity deviation converge to zero.

The case that the inertia moment and the viscosity coefficient of the load machine 3 are regarded as the motion characteristic (load machine model) of the load machine 3 will be described in detail below. In the following description, it is assumed that the real control target (plant) has the inertia, the viscous friction, dynamic friction, and an unbalanced load, and that the input to the control target is saturated. The model of these characteristics can be described as illustrated in the following numerical expression 7.

$$\frac{d}{dt}\begin{bmatrix} \theta_M \\ v_M \end{bmatrix} = \begin{bmatrix} 0 & 1 \\ 0 & -\dfrac{D_M}{J_M} \end{bmatrix} \begin{bmatrix} \theta_M \\ v_M \end{bmatrix} + \begin{bmatrix} 0 \\ \dfrac{1}{J_M} \end{bmatrix} u_M \quad (7)$$

$\theta_M$: Model position $v_M$: Model velocity $u_M$: Input to model $J_M$: Model inertia $D_M$: Model viscous friction coefficient In the model described in the numerical expression 7, assuming that input $u_M$ to the model is stepwise input, the position (model output position $\theta_M$) and the velocity (model output velocity $v_M$) of the model are obtained. The Laplace transform of the model output velocity $v_M$ is represented by the following numerical expression 8.

$$L\{v_M(t)\} = \frac{1}{J_M s + D_M} \cdot \frac{u_M}{s} = \frac{u_M}{D_M} \cdot \left(\frac{1}{s} - \frac{1}{s + D_M/J_M}\right) \quad (8)$$

When the numerical expression 8 is subjected to an inverse Laplace transform, the following numerical expression 9 is obtained. At this point, "$v_M(0)=0$" for initial velocity $v_M(0)$.

$$v_M(t) = \frac{u_M}{D_M}\left[1 - \exp\left(-\frac{D_M}{J_M}t\right)\right] \quad (9)$$

A model output position $\theta_M(t)$ can be obtained when the time integration is performed on the numerical expression 9 with "initial position $\theta_M(0)=0$". Therefore, the model output position $\theta_M(t)$ and the model output velocity $v_M(t)$ are represented by the following numerical expression 10.

$$\theta_M(t) = \frac{u_M}{D_M}\left[t + \frac{J_M}{D_M}\left\{\exp\left(-\frac{D_M}{J_M}t\right) - 1\right\}\right] \quad (10)$$

$$v_M(t) = \frac{u'_M}{D_M}\left[1 - \exp\left(-\frac{D_M}{J_M}t\right)\right]$$

In the numerical expression 10, the position deviation $\theta_{err}(t)$ and the velocity deviation $v_{err}(t)$ are defined as "$\theta_{err}(t)=\theta_R-\theta_M(t)$" and "$v_{err}(t)=v_R-v_M(t)$", and a time response to a constant input $u_M$ is obtained under the similar initial condition "$[\theta_{err}(0),v_{err}(0)]=[0,0]$". Therefore, the following numerical expression 11 is obtained.

$$\theta_{err}(t) = -\frac{u_M}{D_M}\left[t + \frac{J_M}{D_M}\left\{\exp\left(-\frac{D_M}{J_M}t\right) - 1\right\}\right] \quad (11)$$

$$v_{err}(t) = -\frac{u_M}{D_M}\left[1 - \exp\left(-\frac{D_M}{J_M}t\right)\right]$$

$$\theta_{err}(t) := \theta_R - \theta_M(t)$$

$$v_{err}(t) := v_R - v_M(t)$$

$\theta_R$: Target position $v_R$: Target velocity

Design of Optimum Switching Curve

Figure 6:
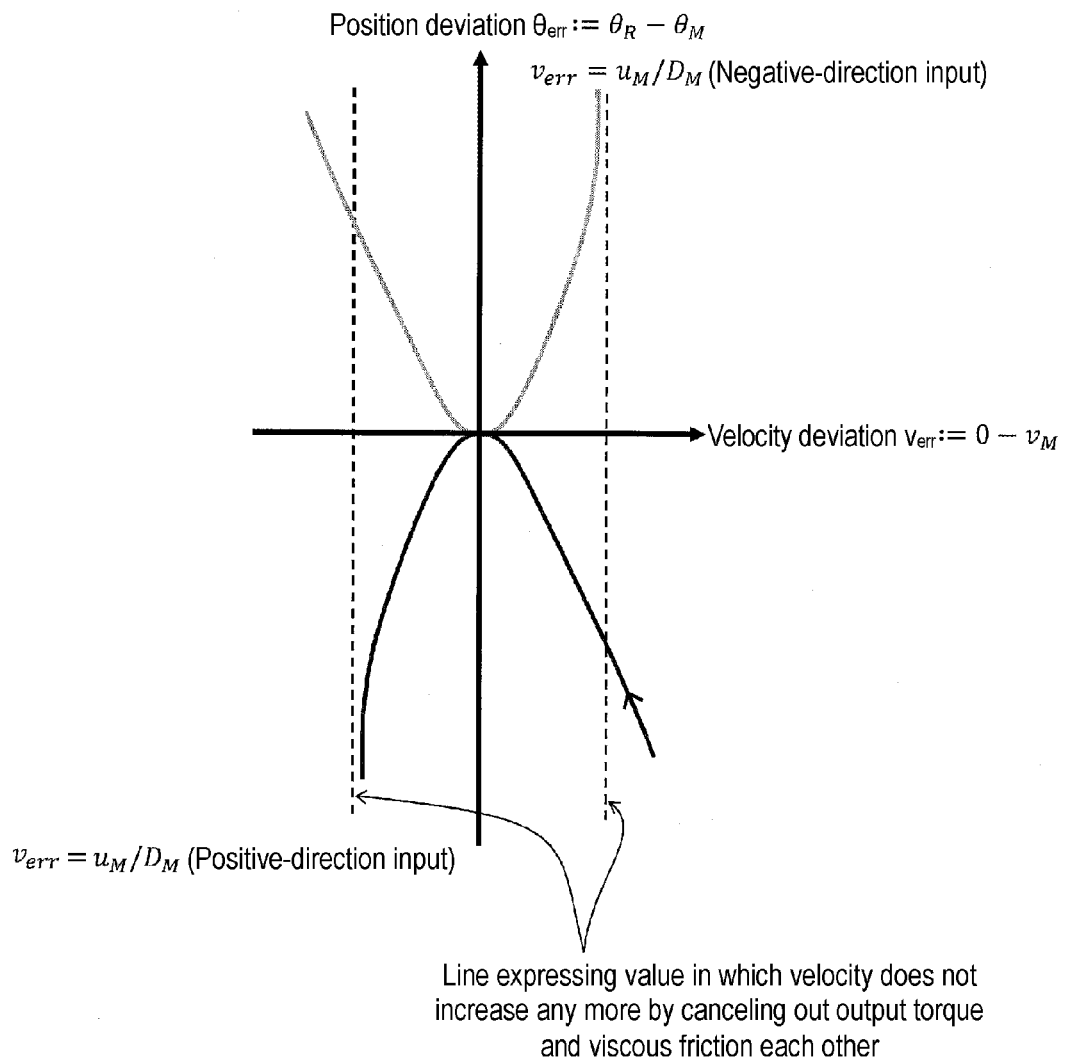
FIG. 6 is a view illustrating the switching curve in the case that the inertia moment and the viscosity coefficient of the load machine are regarded as the motion characteristic of the load machine.

FIG. 6 illustrates the behaviors of the position deviation $\theta_{err}$ and the velocity deviation $v_{err}$ in the case that the input $u_M$ becomes a positive saturated value $\tau_{max,usr}$ and the case that the input $u_M$ becomes a negative saturated value $\tau_{min,usr}$ based on the numerical expression 11.

FIG. 6 illustrates the case that the inertia moment and the viscosity coefficient of the load machine 3 are regarded as the motion characteristic of the load machine 3, and illustrates the switching curve SL defined by the position deviation $\theta_{err}$ and the velocity deviation $v_{err}$ during the constant input, and particularly illustrates the orbit in which "$\theta_{err}=0$" and "$v_{err}=0$" are obtained at "t=0". In FIG. 6, the vertical dotted line is a line expressing a value in which the velocity does not increase any more by canceling out the output torque and the viscous friction each other In order that the model position deviation and the model velocity deviation converge to the origin "$(\theta_{err}, v_{err})=(0, 0)$" with a saturated manipulated value (that is, the positive saturated value $\tau_{max,usr}$ or the negative saturated value $\tau_{min,usr}$), the state is caused to transition to the orbit prior to "t=0" in FIG. 6, namely, the orbit of "t≤0", and the control is implemented along the orbit of "t≤0". At this point, when t is deleted from the numerical expression 11, the optimum switching curve SL can be represented by the following numerical expression 12.

$$\theta_{opt}(v_{err}) := \begin{cases} \frac{J_M \tau_{min,usr}}{D_M^2}\log\left(1 + \frac{D_M}{\tau_{min,usr}}v_{err}\right) - \frac{J_M}{D_M}v_{err} & (v_{err} \leq 0) \\ \frac{J_M \tau_{max,usr}}{D_M^2}\log\left(1 + \frac{D_M}{\tau_{max,usr}}v_{err}\right) - \frac{J_M}{D_M}v_{err} & (v_{err} > 0) \end{cases} \quad (12)$$

The switching curve SL (switching plane) used in the sliding mode control implemented by the sliding mode controller 102 is described above from the viewpoint of the motion characteristic of the load machine 3, which is one factor to determine the switching curve SL. The model velocity deviation (more correctly, the velocity command value $v_R$ generated by the velocity command generator 101) received by the sliding mode controller 102 will be described below with reference to FIGS. 7 and 8.

Velocity Command Value Received by Sliding Mode Controller

The model velocity deviation received by the sliding mode controller 102 is a deviation between the velocity command value $v_R$ and the model output velocity $v_M$, which are generated by the velocity command generator 101 based on the position command value $\theta_R$ provided from the outside (for example, from the user). How to change a behavior of the model controlled by the sliding mode controller 102 by the velocity command value $v_R$ received by the sliding mode controller 102, namely, the velocity command value $v_R$ generated by the velocity command generator 101 will be described below with reference to FIGS. 7 and 8. The case that the velocity command value $v_R$ received by the sliding mode controller 102 is set to "differentiation of the position command value $\theta_R$" and the case that the velocity command value $v_R$ is set to "0" will specifically be described.

In the control device 1, the velocity command value $v_R$ received by the sliding mode controller 102 can be set to "0". That is, the velocity command generator 101 may output the velocity command value that is "0" to the sliding mode controller 102.

According to the above configuration, in the control device 1, because the velocity command value $v_R$ is zero, the model output velocity $v_M$ also becomes zero at a point of time the position of the servo motor 2 arrives at the target position, and the model output position $\theta_M$ does not overshoot.

FIG. 7 is a view illustrating the locus of the model output position $\theta_M$ when the velocity command is set to "0" with respect to the sliding mode control implemented by the control device 1, namely, FIG. 7 is a view illustrating the behavior of the model controlled by the sliding mode controller 102 when the velocity command value $v_R$ received by the sliding mode controller 102 is set to "0". As illustrated in FIG. 7, when the velocity command value $v_R$ received by the sliding mode controller 102 is set to "0", high command followability is obtained for the position command value $\theta_R$ while the model output position $\theta_M$ does not overshoot while a delay is generated by respect to the position command value $\theta_R$ to degrade the command followability.

In the control device 1, the velocity command value $v_R$ received by the sliding mode controller 102 can be set to "the differentiation of the position command". That is, the velocity command generator 101 may output the velocity command value $v_R$ that is "the differentiation of the position command" to the sliding mode controller 102.

Figure 8:
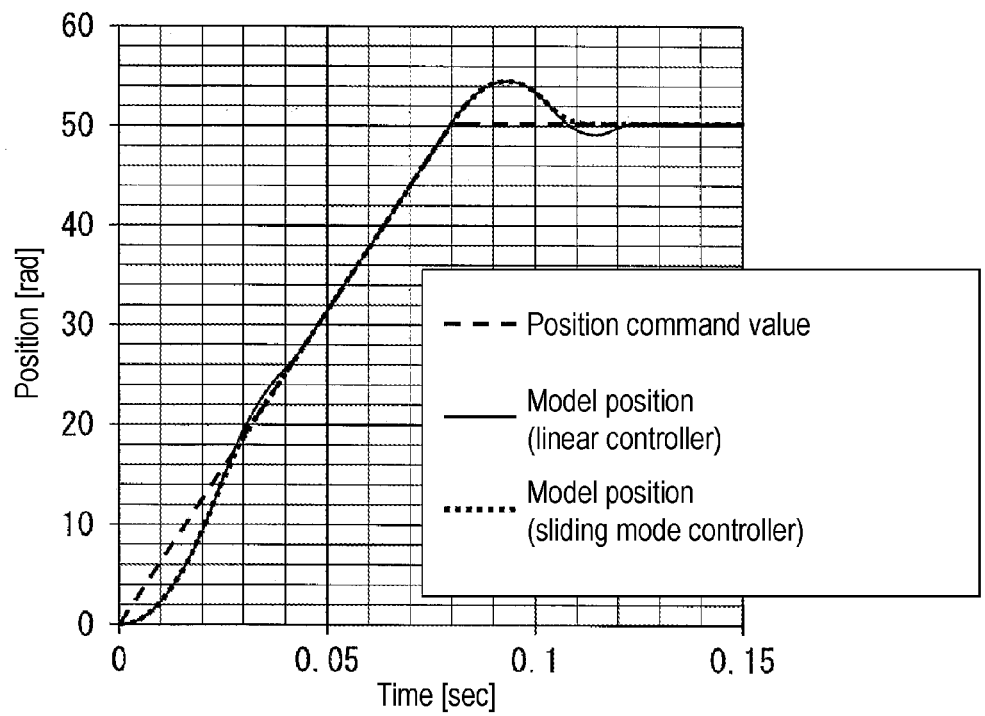
FIG. 8 is a view illustrating a locus of a model output position when a velocity command is set to differentiation of a position command with respect to the sliding mode control implemented by the control device in FIG. 1.

FIG. 8 is a view illustrating the locus of the model output position $\theta_M$ when the velocity command is set to the differentiation of the position command with respect to the sliding mode control implemented by the control device 1, namely, FIG. 8 is a view illustrating the behavior of the model controlled by the sliding mode controller 102 when the velocity command value $v_R$ received by the sliding mode controller 102 is set to "the differentiation of the position command value θR". As illustrated in FIG. 8, when the velocity command value $v_R$ received by the sliding mode controller 102 is set to "the differentiation of the position command value $\theta_R$", high command followability is obtained for the position command value $\theta_R$ while the model output position $\theta_M$ can overshoot.

Limitation of Model Output Torque According to Model Output Velocity

Because the maximum velocity of the servo motor 2 is fixed, it is undesirable that the model output velocity $v_M$ controlled by the sliding mode controller 102 is larger than the maximum velocity. That is, preferably, in the control device 1, it is preferable that the model output velocity $v_M$ is less than the maximum output velocity of the servo motor 2.

According to the above configuration, in the control device 1, the model output velocity $v_M$ controlled by the feedforward controller 10 is less than the maximum output velocity of the servo motor 2.

At this point, when the model output velocity $v_M$ is set larger than the maximum output velocity of the servo motor 2, the actual servo motor 2 cannot follow, but the control behavior of the model becomes different.

In the control device 1, the model output velocity $v_M$ is less than the maximum output velocity of the servo motor 2, so that the control device 1 can implement the model following control on the servo motor 2 using the model that can be followed by the servo motor 2.

Specifically, assuming that va is a "threshold at which velocity limiting is started" and that vb is a "velocity limiting value", the sliding mode controller 102 limits the output (model output torque) according to the model output velocity $v_M$ as illustrated in the following model output torque calculating method.

Model Output Calculating Method

1. For $v_{model} \times \tau_{model} \leq 0$ (the case that the model output velocity comes close to "0") or for $|v_{model}| < v_a$
   The model output torque is not limited.
2. The case that $v_a < |v_{model}| < v_b$ is obtained for $v_{model} \times \tau_{model} > 0$.

$$\tau'_{model} = \tau_{model} \times \frac{v_b - |v_{model}|}{v_a} \times 10$$

(The buffer area is generated such that the model output torque becomes 100% for $|v_{model}| = v_a$ and such that the model output torque becomes 0% for $|v_{model}| = v_b$.)
3. The case that $|v_{model}| \geq v_b$ is obtained for $v_{model} \times \tau_{model} > 0$.

$$\tau'_{model} = -1 \times \text{sign}(v_{model}) \times \frac{L}{\Delta t}(v_b - |v_{model}|) \quad (13)$$

Figure 9:
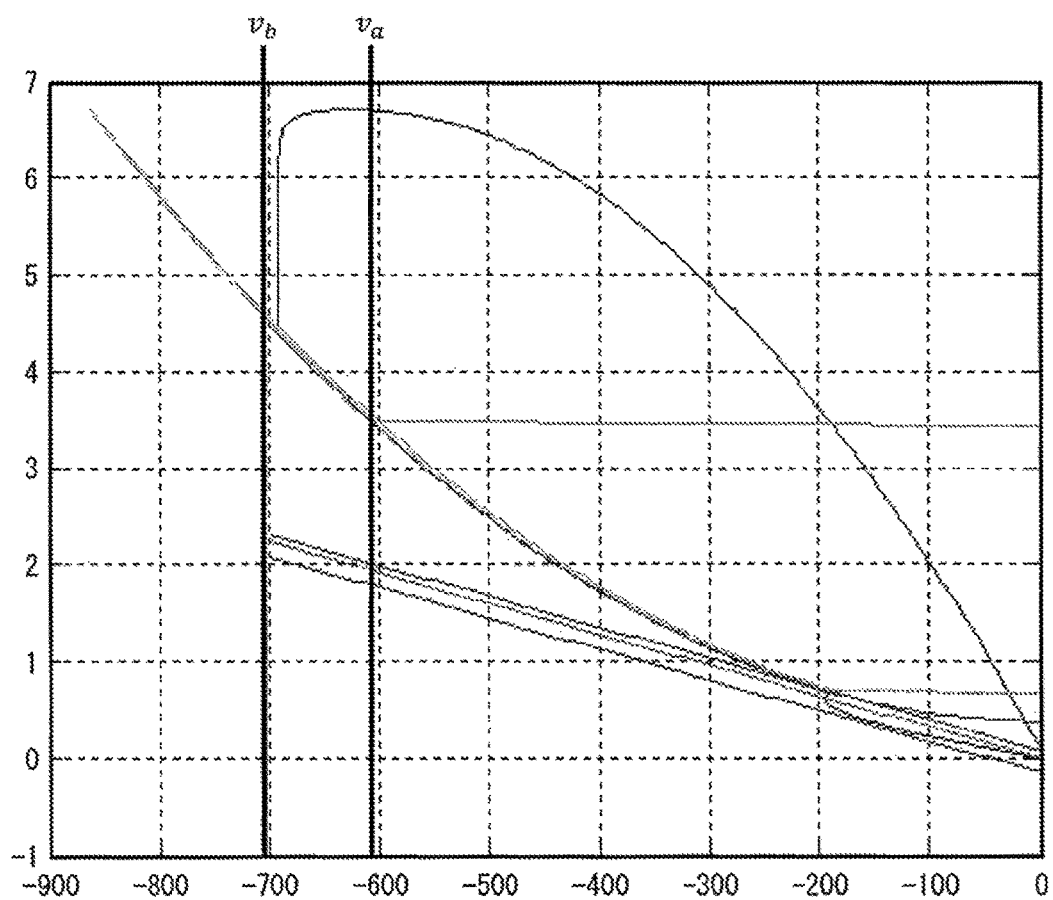
FIG. 9 is a view, assuming that va is a "threshold at which velocity limiting is started" and that vb is a "velocity limiting value", illustrating the case that a model output torque is limited by the sliding mode control according to a model output velocity.

FIG. 9 is a view, assuming that va is a "threshold at which velocity limiting is started" and that vb is a "velocity limiting value", illustrating the case that a model output torque is limited by the sliding mode control according to a model output velocity $v_M$. As illustrated in FIG. 9, the sliding mode controller 102 implements the following control such that the model output velocity $v_M$ controlled by (output from) the sliding mode controller 102 is not larger than the velocity limiting value vb indicating the maximum output velocity of the servo motor 2. That is, when the model output velocity $v_M$ reaches "the threshold va at which the velocity limiting is started", the sliding mode controller 102 limits the output (model output torque) to set the model output velocity $v_M$ to the velocity limiting value vb or less.

Second Embodiment

A second embodiment of the present invention will be described in detail below with reference to FIGS. 11 to 16.

Outline of Control Device of the First Embodiment

In the first embodiment, the sliding mode controller 102 determines the model output torque such that the position and the velocity of the servo motor 2 converges onto the switching curve SL determined by the predetermined torque that can be output from the servo motor 2 and the motion characteristic of the load machine 3 driven by the servo motor 2. At this point, for example, the sliding mode controller 102 uses the constant value $\tau_{max}$ that is previously set as the maximum torque that can be output from the servo motor 2 and the constant value $\tau_{min}$ that is previously set as the minimum torque (that is, the maximum torque in the negative direction) that can be output from the servo motor 2 as the predetermined torque that can be output from the servo motor 2.

However, the maximum torque and the minimum torque vary according to a motor driving state. For example, due to an NT characteristic (N: number of revolutions, T: torque) unique to each motor, absolute values of the maximum torque and minimum torque, which can be output from the motor, decreases with increasing number of revolutions.

The maximum torque and minimum torque, which can be output from the motor, also vary by influences of the dynamic friction varying according to a rotation direction and the viscous friction varying according to the number of revolutions.

Additionally, the maximum torque and minimum torque, which can be output from the motor, vary by the unbalanced load in the load machine 3. As used herein, the unbalanced load means a load generated only in a certain direction with respect to the load machine 3. For example, the unbalanced load is a load generated by an influence of gravitational force when the load machine 3 reciprocates in the vertical direction.

For this reason, in the case that a preset constant value is used as the maximum torque and minimum torque, which can be output from the servo motor 2, without consideration of the variations of the maximum torque and the minimum torque, separation is generated between the predetermined torque, which can be output from the servo motor 2 and is used in the sliding mode controller 102, and the maximum torque and the minimum torque, which can be used in the acceleration and the deceleration of the actual servo motor 2. Resultantly, the servo motor 2 cannot follow the model output torque output from the sliding mode controller 102, which possibly enables the problems such as the overshoot and the hunting.

Figure 11:
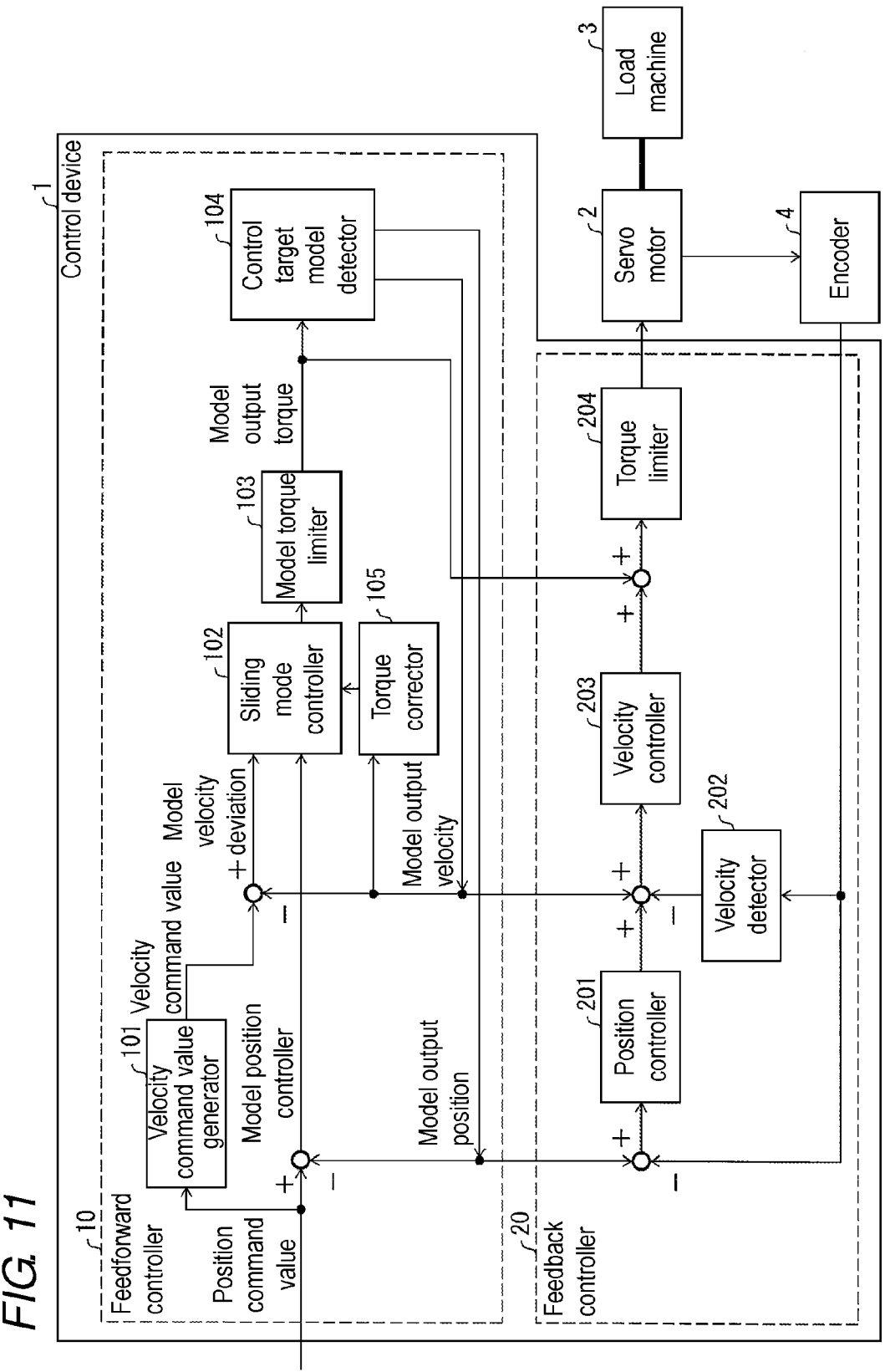
FIG. 11 is a block diagram illustrating a configuration of a main portion of a control device according to a second embodiment of the present invention.

In the second embodiment, the problems can be solved. The second embodiment will be described below with reference to FIG. 11. FIG. 11 is a block diagram illustrating a configuration of a main portion of the control device 1 of the second embodiment. The control device 1 of the second embodiment differs from the control device 1 of the first embodiment in that the control device 1 of the second embodiment includes a torque corrector 105. For convenience, the member having the same function as the first embodiment is designated by the same numeral as the first embodiment, and the description is omitted.

The torque corrector 105 corrects the predetermined torque that can be output from the servo motor 2, based on the driving state of the servo motor 2, the predetermined torque being used by the sliding mode controller 102 in order to determine the switching curve SL.

When the control device 1 includes the torque corrector 105, the predetermined torque that can be output from the servo motor 2 is corrected based on the driving state of the servo motor 2, and the setting of the sliding mode controller 102 is performed using the torque value that can actually be used in the acceleration and the deceleration. Therefore, the stability of the motor behavior is improved in the case that the sliding mode controller 102 is used.

The torque corrector 105 may correct the predetermined torque with the actual driving state of the servo motor 2 as the driving state of the servo motor 2, or correct the predetermined torque with the model state output from the control target model detector 305 as the driving state of the servo motor 2.

However, sometimes the actual driving state of the servo motor 2 is influenced by an accidental disturbance and the like. In such cases, the model output torque is possibly unstabilized when the predetermined torque is corrected using the actual driving state of the servo motor 2. Therefore, in an environment easily influenced by the accidental disturbance and the like, preferably the torque corrector 105 corrects the predetermined torque with the model state output from the control target model detector 305 as the driving state of the servo motor 2.

In the case that the actual driving state of the servo motor 2 is used as the driving state of the servo motor 2, the torque corrector 105 may use the position (real position) of the servo motor 2 detected by the encoder 4 or the velocity (real velocity) output from the velocity detector 202. In the case that the model state is used as the driving state of the servo motor 2, the torque corrector 105 may use the model output position or model output velocity output from the control target model detector 305.

Calculation Method

A specific example of a calculation method performed by the torque corrector 105 will be described below with reference to FIG. 16.

Figure 16:
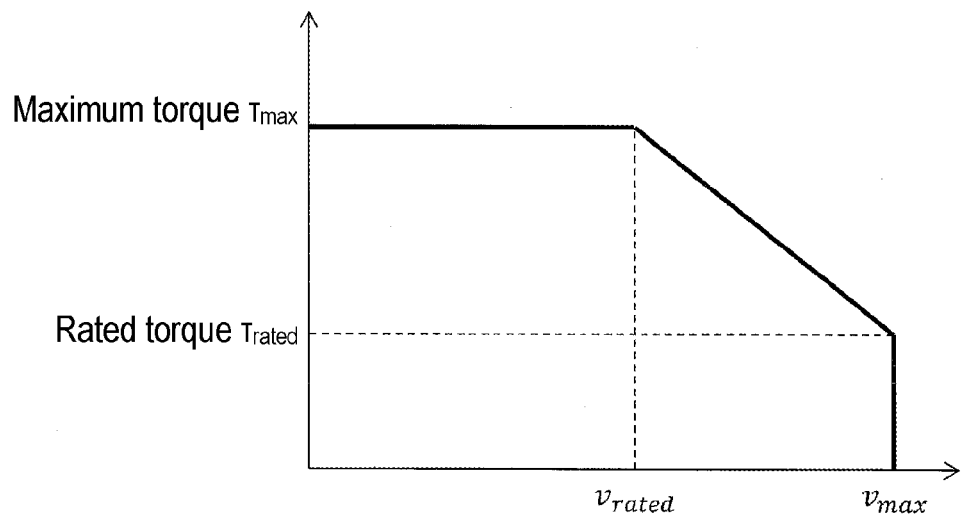
FIG. 16 is a view illustrating a torque correcting method performed by a torque corrector.

In FIG. 16, $\tau_{max}$ is maximum torque, $\tau_{rated}$ is a rated torque, $v_{rated}$ is a rated velocity, and $v_{max}$ is the maximum velocity. As illustrated in FIG. 16, using the rated velocity $v_{rated}$, the maximum velocity $v_{max}$, the rated torque $\tau_{rated}$, and the maximum torque $t_{max}$, the torque corrector 105 corrects the predetermined torque, which can be output from the servo motor 2 and is used to determine the switching curve SL, on the straight line connecting ($v_{rated}$, $\tau_{max}$) and ($v_{max}$, $\tau_{rated}$).

At this point, using a gradient K, a torque decrease value $\tau_{dec}(v)$ in a certain velocity v is calculated by the following numerical expression 14. The torque decrease value $\tau_{dec}(v)$ is a negative value. It should be noted that v is greater than 0. The gradient K is represented by the following numerical expression 15.

$$\begin{cases} \tau_{dec}(v) = 0 & (v < v_{rated}) \\ \tau_{dec}(v) = -K(v - v_{rated}) & (v \geq v_{rated}) \end{cases} \quad (14)$$

$$K = \frac{\tau_{max} - \tau_{rated}}{v_{max} - v_{rated}} \quad (15)$$

Using the gradient K obtained by the numerical expression 15, the torque corrector 105 obtains a corrected maximum torque (the maximum torque in the positive direction) $\tau_{lim\_max}$ and a corrected minimum torque (that is, the maximum torque in the negative direction) $\tau_{lim\_min}$ as the predetermined torque, which can be output from the servo motor 2 and is used to determine the switching curve SL, as illustrated in the following numerical expression 16. The torque corrector 105 may use the model output velocity $v_M$ output from the control target model detector 104 or the real velocity output from the velocity detector 202 as the velocity v.

$$\tau_{lim\_max} := \begin{cases} \tau_{u\_max} & (\tau_{u\_max} < \tau_{max} + \tau_{dec}(v)) \\ \tau_{max} + \tau_{dec}(v) & (\tau_{u\_max} \geq \tau_{max} + \tau_{dec}(v)) \end{cases} \quad (16)$$

$$\tau_{lim\_min} := \begin{cases} \tau_{u\_min} & (\tau_{u\_min} > -\tau_{max} - \tau_{dec}(v)) \\ \tau_{max} - \tau_{dec}(v) & (\tau_{u\_min} \leq -\tau_{max} - \tau_{dec}(v)) \end{cases}$$

In the numerical expression 16, $\tau_{u\_max}$ and $\tau_{u\_min}$ respectively represent an upper limit and a lower limit of the torque limiter 204 (the positive and negative maximum values of the torque that can actually be output from the servo motor 2 can be set to the upper limit and the lower limit of the torque limiter 204). The user can set the upper limit and the lower limit of the torque limiter 204, and a positive value of $\tau_{max}$ or less and a negative value of $-\tau_{max}$ ($=\tau_{min}$) or more are set to the upper limit and the lower limit. Absolute values of the upper and lower limits of the torque limiter 204 may be different from each other. Unless the user sets the upper limit and the lower limit of the torque limiter 204, an upper limit $\tau_{u\_max}$ of the torque limiter 204 is set to $\tau_{max}$, and a lower limit $\tau_{u\_min}$ of the torque limiter 204 is set to $-\tau_{max}$.

According to the numerical expression 16, the torque corrector 105 sets $\tau_{max}+\tau_{dec}(v)$ to a corrected maximum torque $\tau_{lim\_max}$ when a value in which the torque decrease value $\tau_{dec}(v)$ is added to the maximum torque $\tau_{max}$ of the servo motor 2 (that is, the absolute value of the torque decrease value $\tau_{dec}(v)$ is subtracted) is less than or equal to the upper limit $\tau_{u\_max}$. On the other hand, the torque corrector 105 sets $\tau_{u\_max}$ to the corrected maximum torque $\tau_{lim\_max}$ when the value in which the torque decrease value $\tau_{dec}(v)$ is added to the maximum torque $\tau_{max}$ of the servo motor 2 is larger than the upper limit $\tau_{u\_max}$ set by the user. Similarly, the torque corrector 105 sets a corrected minimum torque $\tau_{lim\_min}$.

The sliding mode controller 102 determines the switching curve SL using the corrected maximum torque $\tau_{lim\_max}$ and corrected minimum torque $\tau_{lim\_min}$ which are calculated by the torque corrector 105.

For example, the switching curve SL of the sliding mode in consideration of only the inertia moment is calculated by the following numerical expression 17 in which $\tau_{max}$ and $\tau_{min}$ in the numerical expression 4 are replaced with the corrected maximum torque $\tau_{lim\_max}$ and corrected minimum torque $\tau_{lim\_min}$ which are calculated by the above calculation.

$$\sigma(\theta_{err}, v_{err}) := \begin{cases} \theta_{err} + \dfrac{J_M}{2\tau_{lim\_max}} v_{err}^2 = 0 & (v_{err} \geq 0) \\ \theta_{err} + \dfrac{J_M}{2\tau_{lim\_min}} v_{err}^2 = 0 & (v_{err} < 0) \end{cases} \quad (17)$$

Figure 15:
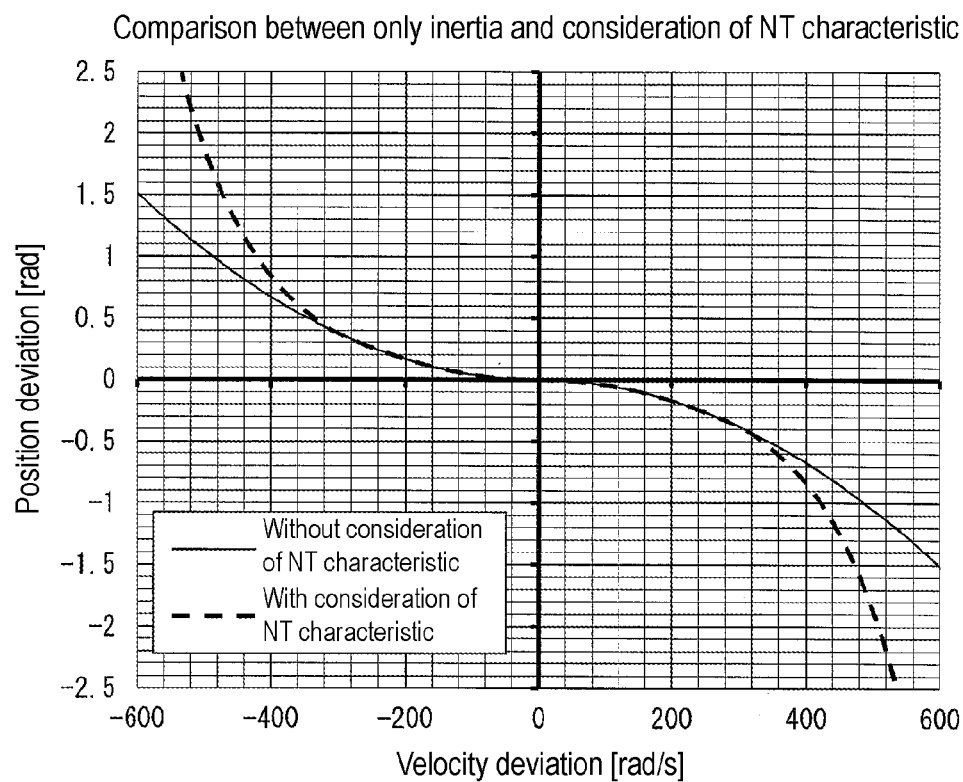
FIG. 15 is a view illustrating a shortest time convergence switching curve SL for the sliding mode control implemented by the control device.

FIG. 15 is a view illustrating a difference of the shortest time convergence switching curve SL between the case that the control device 1 includes the torque corrector 105 and the case that the control device 1 does not include the torque corrector 105. As can be seen from FIG. 15, the switching curve SL changes largely when the control device 1 includes the torque corrector 105.

The switching curve SL of the sliding mode in consideration of the inertia moment and the viscous friction may be calculated using a numerical expression in which $\tau_{max,usr}$ and $\tau_{min,usr}$ in the numerical expression 12 are replaced with the corrected maximum torque $\tau_{lim\_max}$ and corrected minimum torque $\tau_{lim\_min}$ which are calculated by the above calculation.

Thus, when the control device 1 includes the torque corrector 105, the NT characteristic and the like can be considered. Specifically, the torque corrector 105 can output the torque that can actually be used in the acceleration and the deceleration of the servo motor 2 as the predetermined torque, which can be output from the servo motor 2 and is used to determine the switching curve SL. Therefore, the sliding mode controller 102 can dynamically obtain the switching curve SL of the sliding mode using the dynamically changing corrected maximum torque $\tau_{lim\_max}$ and corrected minimum torque $\tau_{lim\_min}$. Therefore, the control device 1 can generate the orbit in which the overshoot or the hunting does not occur.

By way of example, the predetermined torque, which can be output from the servo motor 2 and is used to determine the switching curve SL, is corrected using the model output velocity $v_M$ output from the control target model detector 104 or the real velocity output from the velocity detector 202 and the torque decrease value $\tau_{dec}(v)$ calculated based on the NT characteristic.

Alternatively, the torque corrector 105 may obtain the torque decrease value caused by a factor except for the NT characteristic.

For example, in the case that a torque loss is generated in the servo motor 2 due to the dynamic friction, the torque corrector 105 obtains the torque decrease value caused by the dynamic friction. The dynamic friction is a constant in which a sign changes according to the velocity v of the servo motor 2. Therefore, the torque corrector 105 previously stores the constant, determines the sign according to the model output velocity $v_M$ output from the control target model detector 305 or the real velocity output from the velocity detector 202, and obtains the torque decrease value caused by the dynamic friction.

In the case that the torque loss is generated in the servo motor 2 due to the viscous friction, the torque corrector 105 calculates the torque decrease value caused by the viscous friction. The viscous friction is determined by a function that changes according to the velocity v of the servo motor 2. Therefore, the torque corrector 105 previously stores the function, and determines the torque decrease value caused by the viscous friction according to the model output velocity $v_M$ output from the control target model detector 305 or the real velocity output from the velocity detector 202.

In the case that the torque loss is generated due to the unbalanced load in the load machine 3, the torque corrector 105 obtains the torque decrease value caused by the unbalanced load. The torque decrease value caused by the unbalanced load is previously set by an operating test or a simulation of the load machine 3. Therefore, the torque corrector 105 determines timing of generating the unbalanced load based on the model output velocity $v_M$ and/or model output position $\theta_M$ output from the control target model detector 305 or the real position output from the encoder 4 and/or the real velocity output from the velocity detector 202, and sets the previously-stored torque decrease value in the timing of generating the unbalanced load.

The torque corrector 105 may use only one of the torque decrease values caused by various factors, or use a sum in which plural torque decrease values are combined.

Effect

The effect of the torque corrector 105 of the second embodiment will be described with reference to FIGS. 12A to 14B. The case that the NT characteristic is considered will be described by way of example.

Figure 12A:
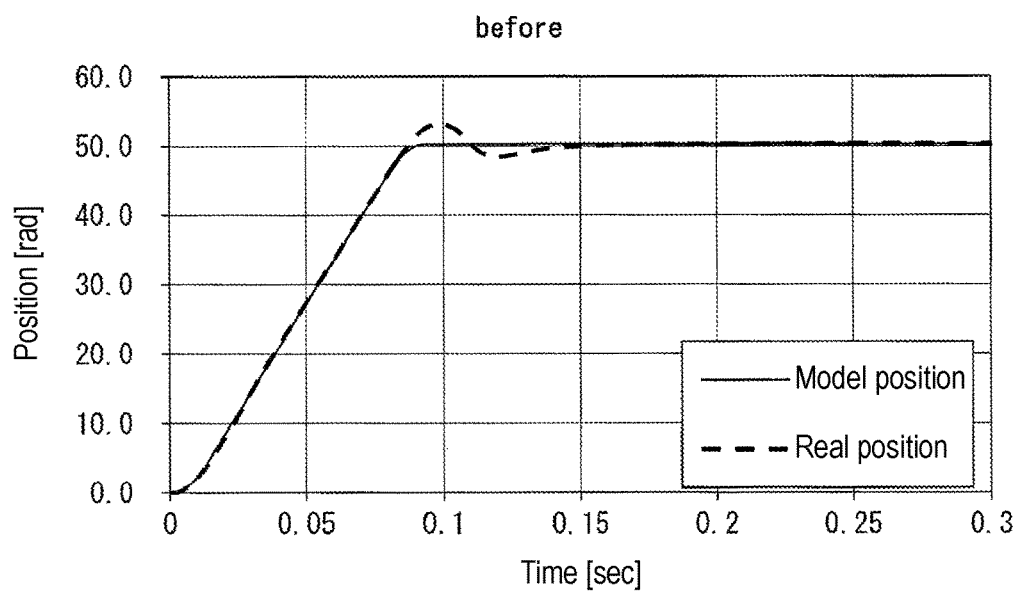
FIGS. 12A and 12B illustrate comparison between a model output position and a real position in the case that a velocity command is set to "0" with respect to the sliding mode control implemented by the control device.
Figure 12B:
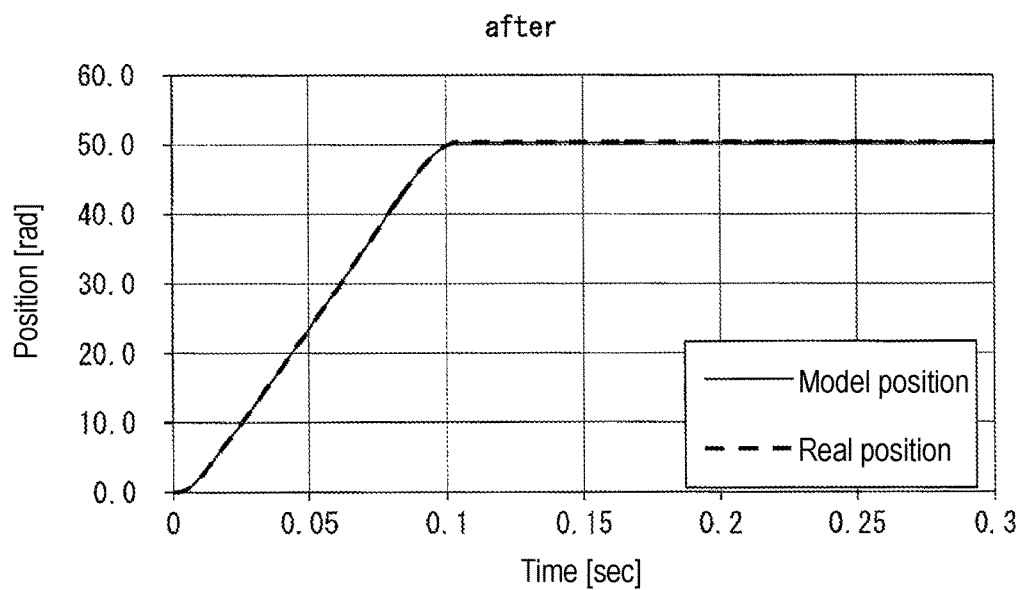
Figure 13A:
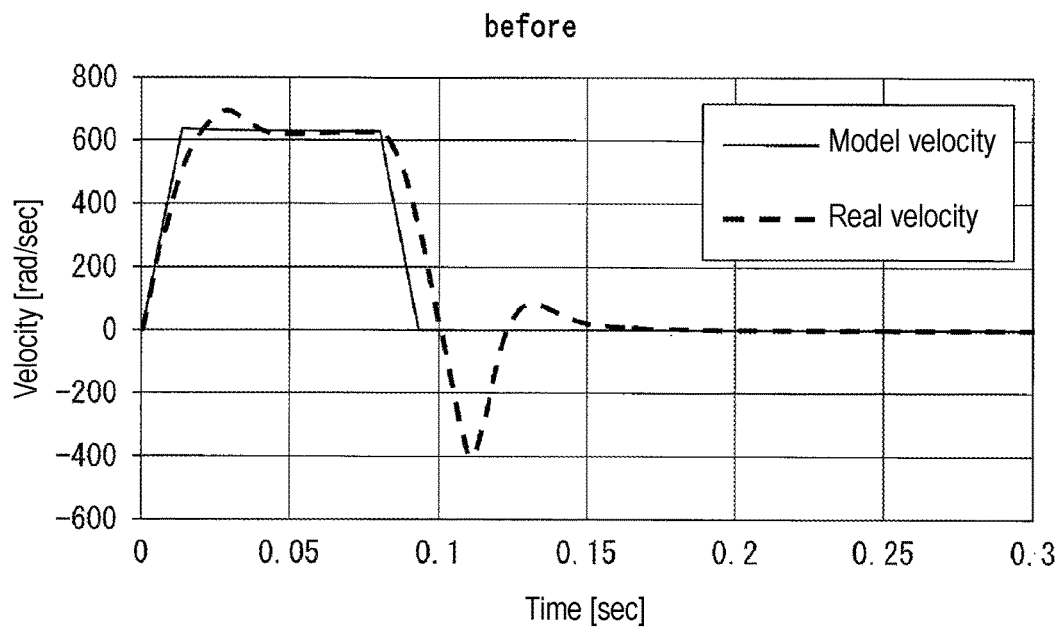
FIGS. 13A and 13B illustrate comparison between a model output velocity and a real velocity.
Figure 13B:
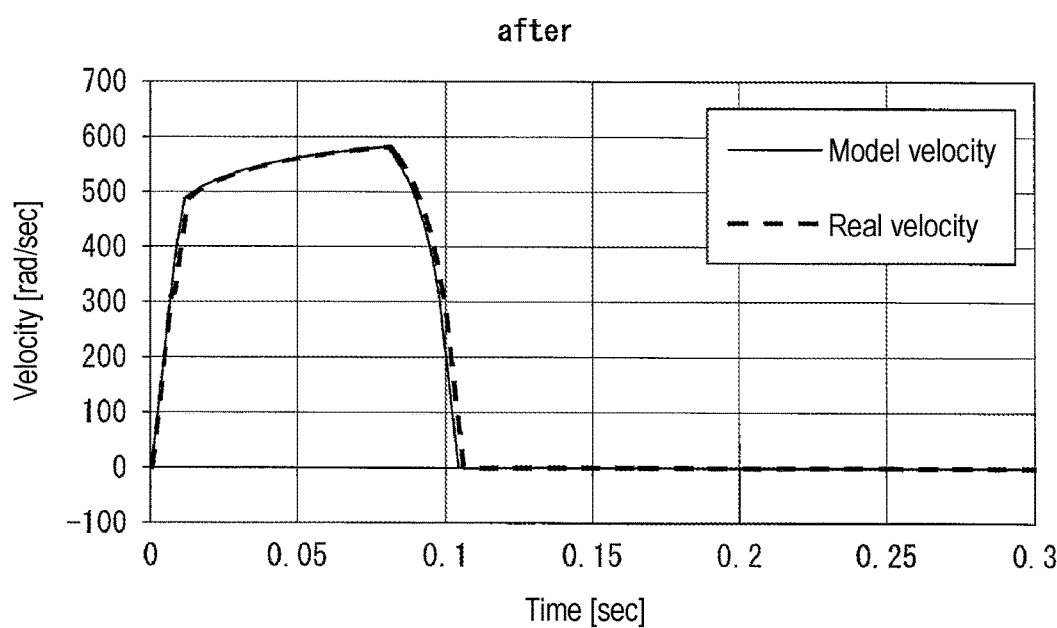
Figure 14A:
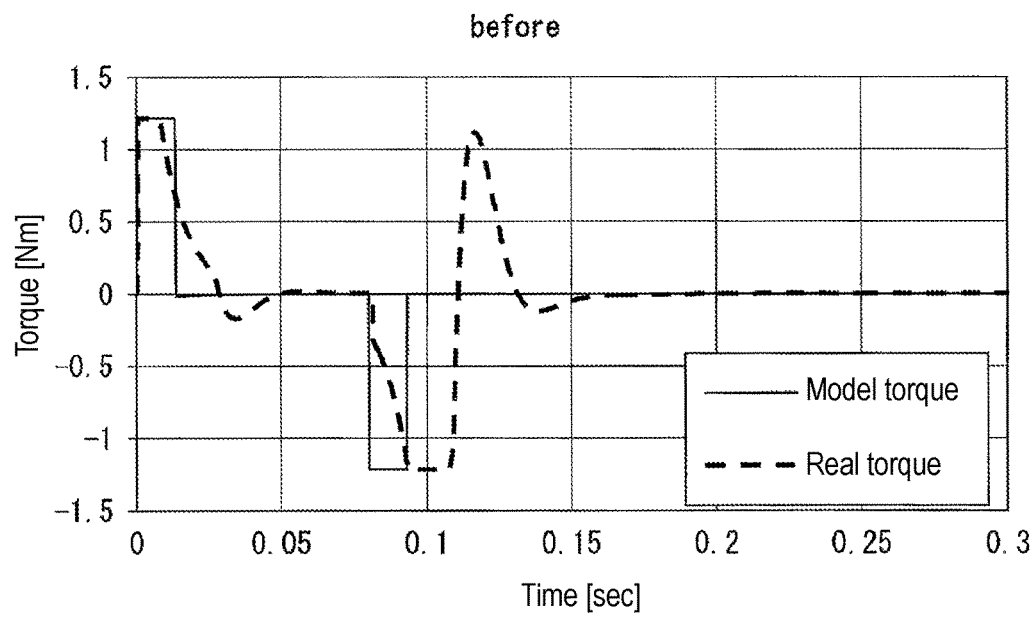
FIGS. 14A and 14B illustrate comparison between a model output torque and a real torque.
Figure 14B:
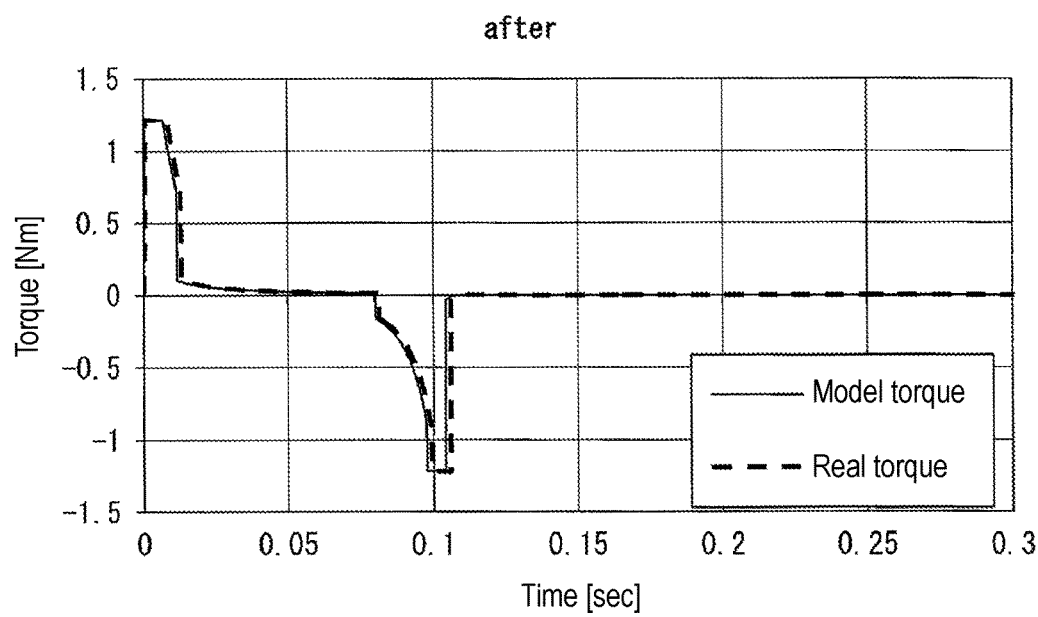

FIGS. 12A to 14B illustrate comparison between the model and the actual state with respect to the position, the velocity, and the torque when the identical operation is performed while the velocity command is set to "0" in the sliding mode control implemented by the control device. That is, FIGS. 12A and 12B illustrate the comparison between the model output position (solid line) and the actual position (real position) (dotted line) of the servo motor, FIGS. 13A and 13B illustrate the comparison between the model output velocity (solid line) and the real velocity (dotted line) of the servo motor 2, and FIGS. 14A and 14B illustrate the comparison between the model output torque (solid line) and the real torque (dotted line) converted from a driving current of the servo motor 2 or the current command value generated by the control device 1. Each of FIGS. 12A, 13A, and 14A is a view corresponding to the sliding mode controller 102 that does not include the torque corrector 105, and each of FIGS. 12B, 13B, and 14B is a view corresponding to the sliding mode controller 102 that includes the torque corrector 105.

As illustrated in FIG. 12A, in the case that the control device 1 does not include the torque corrector 105, the NT characteristic is not considered, and the real position cannot follow the model position, but the hunting occurs during the positioning. However, as illustrated in FIG. 12B, when the control device 1 includes the torque corrector 105, the control is implemented in consideration of the NT characteristic, the hunting is eliminated, and the model position is matched with the real position.

As illustrated in FIG. 13A, in the case that the control device 1 does not include the torque corrector 105, the NT characteristic is not considered, namely, the decrease of the torque that can actually be used in the acceleration and the deceleration of the motor is not considered. Therefore, the real velocity cannot follow the model output velocity, but the hunting occurs during the positioning. However, as illustrated in FIG. 13B, when the control device 1 includes the torque corrector 105, the control is implemented in consideration of the NT characteristic, the hunting is eliminated, and the model output velocity is matched with the real velocity.

As illustrated in FIG. 14A, in the case that the control device 1 does not include the torque corrector 105, the NT characteristic is not considered, namely, the decrease of the torque that can actually be used in the acceleration and the deceleration of the motor is not considered. Therefore, a difference is generated between the model output torque (described as the model torque in FIG. 14A) and the real torque. However, as illustrated in FIG. 14B, when the control device 1 includes the torque corrector 105, the control is implemented in consideration of the NT characteristic, and the model output torque is matched with the real torque.

Implementable Example by Software

The control blocks (particularly, the feedforward controller 10, the velocity command generator 101, the sliding mode controller 102, the model torque limiter 103, the control target model detector 104, the feedback controller 20, the position controller 201, the velocity detector 202, the velocity controller 203, and the torque limiter 204) of the control device 1 may be constructed with a logic circuit (hardware) formed in an integrated circuit (IC chip), or implemented by software using a central processing unit (CPU).

In the latter case, the control device 1 includes a CPU that executes a command of the program that is of software implementing each function, a read only memory (ROM) or a storage device (referred to as a "recording medium") in which the program and computer (or CPU)-readable various pieces of data are stored, and a random access memory (RAM) in which the program is expanded. The computer (or the CPU) reads the program from the recording medium to execute the program, thereby achieving the object of the present invention. A "non-transient physical medium" such as a tape, a disk, a card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

The present invention is not limited to the embodiments, but various changes can be made without departing from the scope of the present invention. It is noted that the embodiment obtained by a combination of different embodiments is also included in the scope of the present invention.

The invention claimed is:

1. A control device for a servo motor that operates a control target,
the control device comprising
a feedforward controller configured to output a model position, a model velocity, and a model torque based on a preset model of the control target, the model position, the model velocity, and the model torque being target values of a position, a velocity, and a torque of the servo motor,
wherein
the feedforward controller comprises a sliding mode controller configured to determine, based on a model position deviation comprising a deviation between an externally input position command value and the model position and a model velocity deviation that is a deviation between a velocity command value and the model velocity, the model torque such that the model position deviation and the model velocity deviation converge onto a switching curve determined by a predetermined torque that can be output from the servo motor and a motion characteristic of a load machine driven by the servo motor.

2. The control device according to claim 1, further comprising
a feedback controller configured to implement feedback control on the position and the velocity of the servo motor such that the position and the velocity of the servo motor follow the model position and the model velocity controlled by the feedforward controller.

3. The control device according to claim 1, wherein
the motion characteristic is inertia moment of the load machine, and
the switching curve is defined as a quadratic curve in a plane defined with the model position deviation and the model velocity deviation.

4. The control device according to claim 1, wherein
the motion characteristic is inertia moment of the load machine and a viscosity coefficient, and
the switching curve is defined as a sum of a logarithmic curve and a straight line in a plane defined with the model position deviation and the model velocity deviation.

5. The control device according to claim 1, wherein
the velocity command value is zero.

6. The control device according to claim 1, wherein
the predetermined torque that can be output from the servo motor that determines the switching curve is smaller than a maximum torque that can be output from the servo motor.

7. The control device according to claim 1, wherein
the model velocity is less than a maximum output velocity of the servo motor.

8. The control device according to claim 1, further comprising
a torque corrector configured to correct the predetermined torque, based on an actual driving state of the control target or a state of the model of the control target,
wherein
the sliding mode controller determines the model torque using the predetermined torque corrected by the torque corrector.

9. The control device according to claim 8, wherein
the torque corrector corrects the predetermined torque, based on a real velocity or the model velocity of the servo motor.

10. The control device according to claim 9, wherein
the torque corrector obtains an amount of torque decreased due to at least one of a number of revolutions/torque characteristic, dynamic friction, and viscous friction, based on the real velocity or the model velocity of the servo motor, and corrects the predetermined torque by subtraction of the amount of decreased torque.

11. The control device according to claim 8, wherein
the torque corrector obtains an amount of torque decreased due to an unbalanced load generated in operating the control target, and corrects the predetermined torque by subtraction of the amount of decreased torque.

12. A method for controlling a servo motor that implements model following control,
the control method comprising:
controlling, in a feedforward control operation, a model position, a model velocity, and a model torque, which are target values of a position, a velocity, and a torque of the servo motor; and
causing, in a feedback control operation, the position and the velocity of the servo motor to follow the model position and the model velocity controlled in the feedforward control step,
wherein
controlling, in the feedforward control operation, comprises implementing, in a sliding mode control operation, sliding mode control to determine, based on a model position deviation that is a deviation between an externally input position command value and the model position and a model velocity deviation that is a deviation between a velocity command value and the model velocity, the model torque such that the model position deviation and the model velocity deviation converge onto a switching curve, the switching curve being determined by a predetermined torque that can be output from the servo motor and a motion characteristic of a load machine driven by the servo motor.

13. A non-transitory computer-readable recording medium storing an information processing program for controlling a servo motor recorded thereon, the information processing program, when read and executed by a processor, causing the processor to perform operations comprising:

controlling, in a feedforward control operation, a model position, a model velocity, and a model torque, which are target values of a position, a velocity, and a torque of the servo motor; and causing, in a feedback control operation, the position and the velocity of the servo motor to follow the model position and the model velocity controlled in the feedforward control step, wherein controlling, in the feedforward control operation, comprises implementing, in a sliding mode control operation, sliding mode control to determine, based on a model position deviation that is a deviation between an externally input position command value and the model position and a model velocity deviation that is a deviation between a velocity command value and the model velocity, the model torque such that the model position deviation and the model velocity deviation converge onto a switching curve, the switching curve being determined by a predetermined torque that can be output from the servo motor and a motion characteristic of a load machine driven by the servo motor.

* * * * *